(12) United States Patent
Miyoshi et al.

(10) Patent No.: US 12,719,316 B2
(45) Date of Patent: Aug. 25, 2026

(54) ELECTROMAGNETIC ROTARY MACHINERY

(71) Applicant: Mitsubishi Electric Corporation, Tokyo (JP)

(72) Inventors: Masahito Miyoshi, Tokyo (JP); Yuichiro Nakamura, Tokyo (JP); Kenta Motoyoshi, Tokyo (JP); Takumi Tomatsu, Tokyo (JP); Yoshinori Motonishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/120,231

(22) PCT Filed: Apr. 27, 2023

(86) PCT No.: PCT/JP2023/016679

§ 371 (c)(1),
(2) Date: Apr. 11, 2025

(87) PCT Pub. No.: WO2024/224558

PCT Pub. Date: Oct. 31, 2024

(65) Prior Publication Data

US 2026/0005557 A1 Jan. 1, 2026

(51) Int. Cl.
*H02K 1/14* (2006.01)
*H02K 7/09* (2006.01)
*H02K 11/33* (2016.01)

(52) U.S. Cl.
CPC ............... *H02K 1/146* (2013.01); *H02K 7/09* (2013.01); *H02K 11/33* (2016.01)

(58) Field of Classification Search
CPC .......... H02K 1/146; H02K 7/09; H02K 11/33; H02K 2201/03; H02K 1/14; H02K 11/20; H02K 2213/03; F16C 32/04
See application file for complete search history.

(56) References Cited

U.S. PATENT DOCUMENTS

2020/0018318 A1 1/2020 Chen

FOREIGN PATENT DOCUMENTS

JP S56-113825 A 9/1981
JP S60-263725 A 12/1985
(Continued)

OTHER PUBLICATIONS

JP2015171165A English translation (Year: 2026).*
(Continued)

*Primary Examiner* — Christopher M Koehler
*Assistant Examiner* — Viswanathan Subramanian
(74) *Attorney, Agent, or Firm* — XSENSUS LLP

(57) ABSTRACT

A bearingless motor as an electromagnetic rotary machinery includes a rotor and a stator disposed with a gap therebetween, and generates a bearing force that causes the rotor to levitate without contact, by an electromagnetic force or a magnetic force. A stator core includes a back yoke and a plurality of teeth. The teeth each include a tooth body and a tooth tip that is flange shaped. The rotor includes a rotor core and a plurality of permanent magnets. Permeance, which is an amount representing the ease of flowing of magnetic flux, of at least one of the gap and iron cores in a magnetic circuit that goes around the stator and the rotor along a radial direction and a circumferential direction decreases in one direction from one end side to another end side in an axial direction.

14 Claims, 13 Drawing Sheets

(56) References Cited

FOREIGN PATENT DOCUMENTS

| | | | |
|---|---|---|---|
| JP | H01-123458 | U | 8/1989 |
| JP | 2002-315258 | A | 10/2002 |
| JP | 2015-171165 | A | 9/2015 |
| JP | 2020-008163 | A | 1/2020 |

OTHER PUBLICATIONS

JP2002315258 English translation (Year: 2026).*
JPS60263725A English translation (Year: 2026).*
JP2020008163A English translation (Year: 2026).*
International Search Report and Written Opinion mailed on Jul. 18, 2023, received for International Application No. PCT/JP2023/016679, filed on Apr. 27, 2023, 10 pages including English Translation.
Notification of Reason for Refusal mailed on Dec. 26, 2023, received for JP Application 2023-559114, 8 pages including English Translation.
Decision to Grant a Patent mailed on Mar. 12, 2024, received for JP Application 2023-559114, 7 pages including English Translation.

* cited by examiner

FIG.1

ELECTROMAGNETIC ROTARY MACHINERY

CROSS-REFERENCE TO RELATED APPLICATION

This application is a national stage application, pursuant to 35 U.S.C. § 371, of International Patent Application No. PCT/JP2023/016679, filed Apr. 27, 2023, the entire contents of which are incorporated herein by reference.

FIELD

The present disclosure relates to an electromagnetic rotary machinery such as a magnetic bearing or a bearingless motor.

BACKGROUND

In an electromagnetic rotary machinery such as a magnetic bearing or a bearingless motor, when a rotor is displaced in an axial direction, a restoring force in the axial direction is generated between the rotor and a stator. When the restoring force is small, a problem occurs such as: a decrease in the stability of magnetic levitation; a decrease in the area where bearing force and torque are generated between the stator and the rotor due to an increase in an axial displacement; or detachment of the rotor from the stator.

Patent Literature 1 discloses that in an inner rotor bearingless rotating machine, a rotor has a trapezoidal shape, an abacus bead shape, a hand drum shape, or a spherical shape as a cross-sectional shape along an axial direction; and in an outer rotor bearingless rotating machine, a stator has a trapezoidal shape or an abacus bead shape as a cross-sectional shape along the axial direction, so that such structures allow for an increase in an axial restoring force acting between the rotor and the stator.

CITATION LIST

Patent Literature

Patent Literature 1: Japanese Patent Application Laid-open No. 2002-315258

SUMMARY OF INVENTION

Problem to be solved by the Invention

In the method of Patent Literature 1, surfaces of the rotor and the stator facing each other have tapered shapes, for example, so that the axial restoring force is increased, but when the rotor is moved in the axial direction or when an axial displacement thereof at the time of rotation is large, the rotor and the stator come into contact with each other. This requires time and labor for assembly and disassembly work, and causes a problem such as a decrease in torque due to an increase in a gap between the rotor and the stator.

The present disclosure has been made in view of the above, and an object of the present disclosure is to provide an electromagnetic rotary machinery capable of increasing an axial restoring force of a rotor without deteriorating assemblability and disassemblability.

Means to Solve the Problem

In order to solve the above problem and achieve the object, an electromagnetic rotary machinery of the present disclosure: includes a rotor and a stator disposed across a gap from the rotor; and configured to generate a bearing force that causes the rotor to levitate without contact, by an electromagnetic force or a magnetic force. In the electromagnetic rotary machinery, at least one of the rotor and the stator includes a plurality of teeth formed of a plurality of tiers of iron cores around which a winding is wound. Permeance, which is an amount representing the ease of flowing of magnetic flux, of at least one of the gap and the iron cores in a magnetic circuit that goes around the stator and the rotor along a radial direction and a circumferential direction decreases in one direction from one end side to another end side in an axial direction.

Effects of the Invention

The electromagnetic rotary machinery of the present disclosure can increase the axial restoring force of the rotor without deteriorating assemblability and disassemblability.

BRIEF DESCRIPTION OF DRAWINGS

FIG. 1 is a bottom view illustrating a configuration of a bearingless motor as an electromagnetic rotary machinery of a first embodiment.

Description of Embodiments

Figure 2:
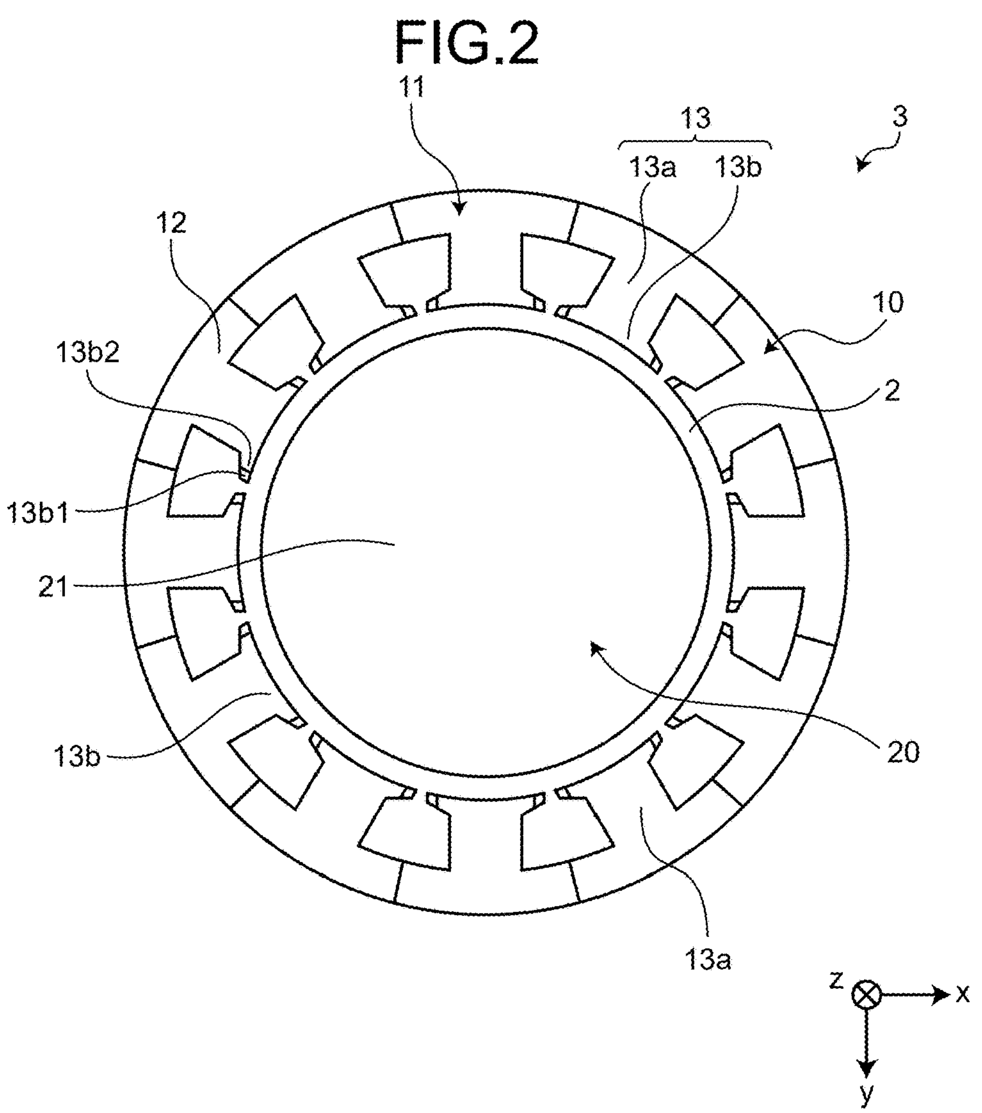
FIG. 2 is a bottom view illustrating a configuration of a magnetic bearing as the electromagnetic rotary machinery of the first embodiment.

Hereinafter, an electromagnetic rotary machinery according to embodiments will be described in detail with reference to the drawings.

A rotary electric machine for industrial use, in-vehicle use, and the like generally has a bearing such as a rolling bearing in order to support a rotary shaft. The bearing is in mechanical contact with the rotary shaft and a stator, and thus has a loss due to wear or the like, which also causes a failure. Recently, electromagnetic rotary machineries such as magnetic bearings or bearingless motors without mechanical contact have been developed. The magnetic bearing has a function of generating a bearing force that causes the rotor to levitate without contact, by an electromagnetic force or a magnetic force. The bearingless motor has a function of an electric motor that generates torque and a function of a magnetic bearing that generates the above-described bearing force in one magnetic circuit. In order to levitate the rotor of the magnetic bearing or the bearingless motor, it is necessary to actively control all five degrees of freedom except a direction of rotation around the rotary shaft, or to have a passive and stable structure without actively controlling some of the five degrees of freedom. Note that the above-described electromagnetic force or magnetic force means a force acting on a permanent magnet and an iron core, a force acting on the permanent magnet and a current, a force acting on the iron core and the current, and the like.

The magnetic bearing or bearingless motor of a biaxial control type detects a position of the rotor only in a radial direction using a sensor, and adjusts the bearing force in the radial direction such that the detected position coincides with a target position. That is, the magnetic bearing or bearingless motor of the biaxial control type performs active control only in the radial direction. The radial direction includes two directions being an x-axis direction and a y-axis direction when the rotary shaft corresponds to a z axis. The bearing force is generated typically by flowing a fluctuating current, which contributes to an increase or decrease in the bearing force, through windings and also flowing a bias current through each of the windings or placing a permanent magnet on the magnetic circuit instead of flowing the bias current. Although either method satisfies the following principle, the following description will describe a case of using the permanent magnet.

The magnetic bearing or bearingless motor of the biaxial control type typically has a passive and stable structure without active control with respect to an axial direction of rotation and inclination directions of the rotor. Here, the axial direction is the direction of the z axis, and the inclination directions are θx and θy. Hereinafter, a direction to be controlled is referred to as a controlled direction. On the other hand, a direction that is not controlled and passively stable is referred to as a passively stable direction.

In the electromagnetic rotary machinery such as the magnetic bearing or the bearingless motor, in one case, the rotor includes the permanent magnet and the stator includes the iron core, while in another case, the rotor includes the iron core and the stator includes the permanent magnet, and, for the sake of simplicity, the former case will be described below.

Here, permeance will be described. Permeance is also called magnetic permeance, and indicates the ease of flowing of magnetic flux. When permeance is "P", permeability is "μ", magnetic circuit length is "l", and cross-sectional area of the magnetic circuit is "S", $P=\mu S/l$ holds. That is, the permeance P increases with an increase in the permeability μ, an increase in the cross-sectional area of the magnetic circuit S, or a decrease in the magnetic circuit length l. On the other hand, the permeance P decreases with a decrease in the permeability μ, a decrease in the cross-sectional area of the magnetic circuit S, or an increase in the magnetic circuit length l. Note that a reciprocal of the permeance P indicating the difficulty in flowing magnetic flux is called magnetic resistance or reluctance. Therefore, decreasing the permeance P in one direction from one end side to the other end side in the axial direction is synonymous with increasing the reluctance in one direction from one end side to the other end side in the axial direction.

In order to achieve the passive and stable state, an attractive force between the permanent magnet of the rotor and the iron core of the stator is used. For example, when the rotor is displaced in the axial direction, magnetic flux flows between the permanent magnet of the rotor and the iron core of the stator that are separated by a gap in the radial direction, whereby a force of mutual attraction is generated and acts to restore the displacement of the rotor in the axial direction. As a result, without control, the restoring force is generated in a direction opposite to the direction of the displacement in the axial direction. The attractive force acting between the permanent magnet and the iron core is proportional to the distance, and can thus be considered as a spring force. Hereinafter, this force acting in the axial direction is referred to as an axial restoring force fz. Also, a ratio of the axial restoring force fz to an axial displacement Δz is referred to as a restoring force coefficient kz. Note that hereinafter, the forces in the axial direction generated in regions of the gap are distinguished as an axial restoring force $f_{1Z}$ and an axial restoring force $f_{2Z}$. The total axial restoring force fz acting on the rotor is a sum of the axial restoring force $f_{1Z}$, the axial restoring force $f_{2Z}$, and the like.

As described above, the axial restoring force fz is generated between the rotor and the stator, but when the axial restoring force fz takes a small value, a problem occurs such as a decrease in the stability of magnetic levitation, a decrease in the area where the bearing force and torque are generated between the stator and the rotor due to an increase in the axial displacement, or detachment of the rotor from the stator. This problem becomes more noticeable when the length of the rotor in the axial direction is short. That is, even when the rotor is slightly displaced in the axial direction, if the length of the rotor in the axial direction is made short, the portion of the area where the stator and the rotor face each other decreases significantly. This means that by a slight displacement of the rotor in the axial direction, the level of the torque and the bearing force generated can be significantly lower than the original level. In the case of the biaxial control type, the axial length of the rotor is often designed to be smaller than the radius of the rotor. Therefore, the entire device becomes flat, and it is inevitable that the rotor has a relatively short length in the axial direction.

First Embodiment

Figure 1:
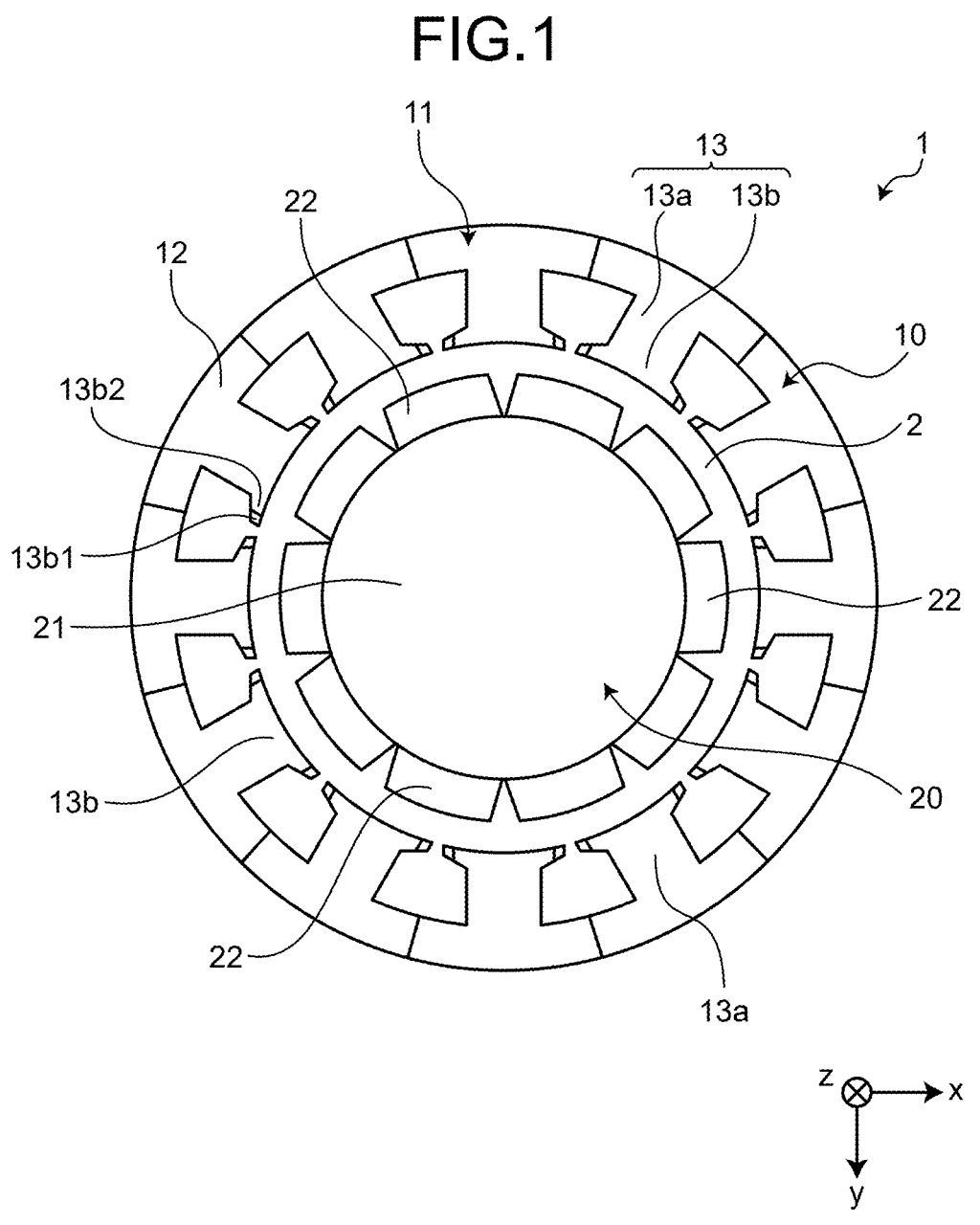

FIG. 1 is a bottom view illustrating a configuration of a bearingless motor 1 as an electromagnetic rotary machinery of a first embodiment. In FIG. 1, a z direction corresponds to a vertical direction (up-down direction), and an xy plane is perpendicular to a z axis. In FIG. 1, the xy plane of the bearingless motor 1 is viewed from below. The bearingless motor 1 includes a stator 10 and a rotor 20. The stator 10 includes a stator core 11 and windings (not illustrated). The stator core 11 includes a back yoke 12 serving as an outer peripheral magnetic circuit and a plurality of teeth 13. The plurality of the teeth 13 protrude inward from the back yoke 12. Each of the teeth 13 includes a tooth body 13*a* and a plurality of tooth tips 13*b* each of which is flange shaped and protrudes from a tip of the tooth body 13*a* to both sides in a circumferential direction. Each of the tooth tips 13*b* includes an upper tooth tip 13*b*1 and a lower tooth tip 13*b*2, which will be described later in detail. The stator core 11 may be a thick bulk body of a ferromagnetic material such as iron, laminated steel plates in which a plurality of steel plates is laminated, or a powder core.

The rotor 20 includes a rotor core 21 and a plurality of permanent magnets 22. The rotor 20 is disposed inside the stator 10 with a gap 2 therebetween. Although the windings are not illustrated for the sake of convenience, the windings may include two types of windings that are support windings for levitating the stator 10 and electric motor windings for generating torque, or may include only the support windings. The windings of only one type may be prepared, and a sum of a current for generating a bearing force and a current for generating the torque may be applied to the windings. With the presence of the permanent magnets 22, a bias magnetic flux passes between the stator 10 and the rotor 20 in the gap 2 without flowing a bias current through the windings. Moreover, with the presence of the permanent magnets 22, magnet torque for rotating the rotor 20 can be generated, which enables the machinery to function as the bearingless motor. The rotor core 21 may be a thick bulk body of a ferromagnetic material such as iron, laminated steel plates in which a plurality of steel plates is laminated, or a powder core.

Figure 3:
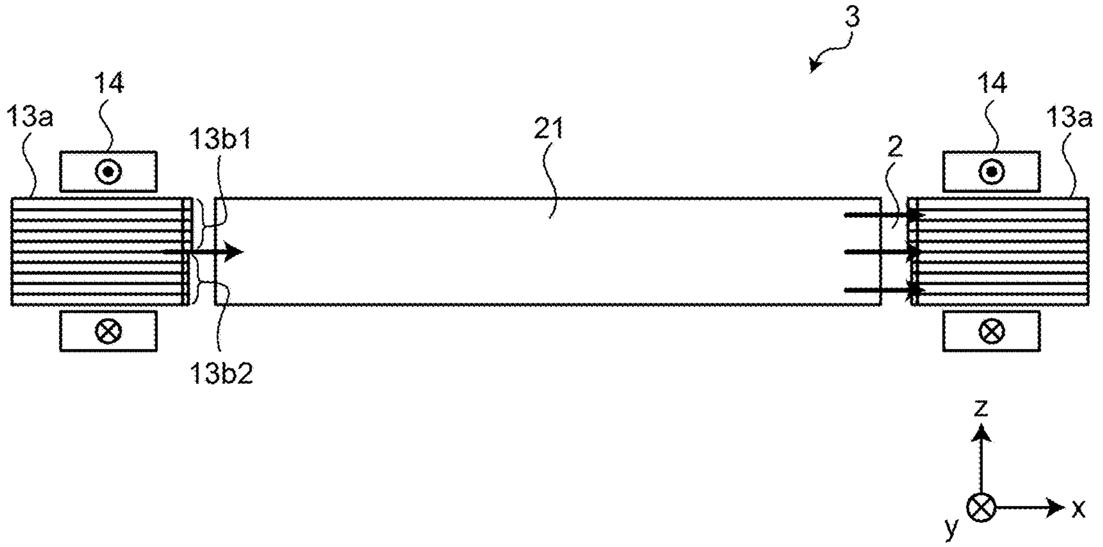
FIG. 3 is a cross-sectional view illustrating the configuration of the magnetic bearing as the electromagnetic rotary machinery of the first embodiment.

FIG. 2 is a bottom view illustrating a configuration of a magnetic bearing 3 as the electromagnetic rotary machinery of the first embodiment. In FIG. 2, an xy plane of the magnetic bearing 3 is viewed from below. FIG. 3 is a cross-sectional view illustrating the configuration of the magnetic bearing 3 as the electromagnetic rotary machinery of the first embodiment. FIG. 3 is obtained by taking a cross section of FIG. 2 along an xz plane. In the magnetic bearing 3, the rotor 20 includes only the rotor core 21 and does not include the permanent magnet 22. The configuration of the stator 10 is similar to that in FIG. 1. While FIG. 2 does not illustrate windings 14, FIG. 3 illustrates the windings 14.

The magnetic bearing 3 includes the stator 10 and the rotor 20. The stator 10 includes the stator core 11 and the windings 14. The stator core 11 includes the back yoke 12 serving as an outer peripheral magnetic circuit and a plurality of the teeth 13. The plurality of the teeth 13 protrude inward from the back yoke 12. Each of the teeth 13 includes the tooth body 13*a* and a plurality of the tooth tips 13*b* that are flange shaped and protrude from the tip of the tooth body 13*a* to both sides in the circumferential direction. Each of the tooth tips 13*b* includes the upper tooth tip 13*b*1 and the lower tooth tip 13*b*2, which will be described later in detail.

The rotor 20 includes the rotor core 21. The rotor 20 is disposed inside the stator 10 with the gap 2 therebetween. In this case, the magnetic bearing 3 does not have a permanent magnet disposed in the rotor 20 and thus needs to flow a bias current to the windings 14, but need not flow the bias current when the rotor 20 or the stator 10 includes a permanent magnet. In the configuration of FIG. 2, there is an advantage that a copper loss due to the bias current is not generated.

Next, with reference to FIG. 3, the principle of generating the bearing force in a radial direction of the magnetic bearing 3 will be described. Note that surfaces of the upper tooth tip 13*b*1 and the lower tooth tip 13*b*2 facing the rotor core 21 are actually aligned even with each other, but are stepped in FIG. 3 for easy visual identification of the presence of the upper tier and the lower tier. Here, a case where the bearing force is generated in the x direction will be described. The winding 14 is wound around the tooth body 13*a* on a positive side (right side) of the x axis, and the winding 14 is wound around the tooth body 13*a* on a negative side (left side) of the x axis. A current I+i that is a sum of a bias current "I" and a fluctuating current "i" is flowed to the winding 14 on the positive side (right side) of the x axis, and a current I−i that is a difference between the bias current "I" and the fluctuating current "i" is flowed to the winding 14 on the negative side (left side) of the x axis. At this time, the magnetic flux density can be increased or decreased in the gap 2. Also, considering that the current is proportional to the magnetic flux density and the force is proportional to a square of the magnetic flux density, when a constant is "k", the force acting on a surface of the gap 2 on the positive side (right side) of the x axis is $k(I+i)^2$, and the force acting on a surface of the gap 2 on the negative side (left side) of the X axis is $k(I-i)^2$. A difference between these forces is (4×k×I×i). Therefore, the rotor 20 receives the force of (4×k×I×i) in a positive direction of the x axis. That is, with the bias current "I" being flowed, when the fluctuating current "i" flowing to each of the teeth 13 is adjusted, the force in the radial direction proportional to the fluctuating current "i" can be generated. In a case where it is desired to generate the bearing force also in the y-axis direction, the fluctuating current "i" flowing to another winding need only be adjusted similarly. As a result, the machinery can function as the magnetic bearing that generates the bearing force in the radial direction.

Figure 4:
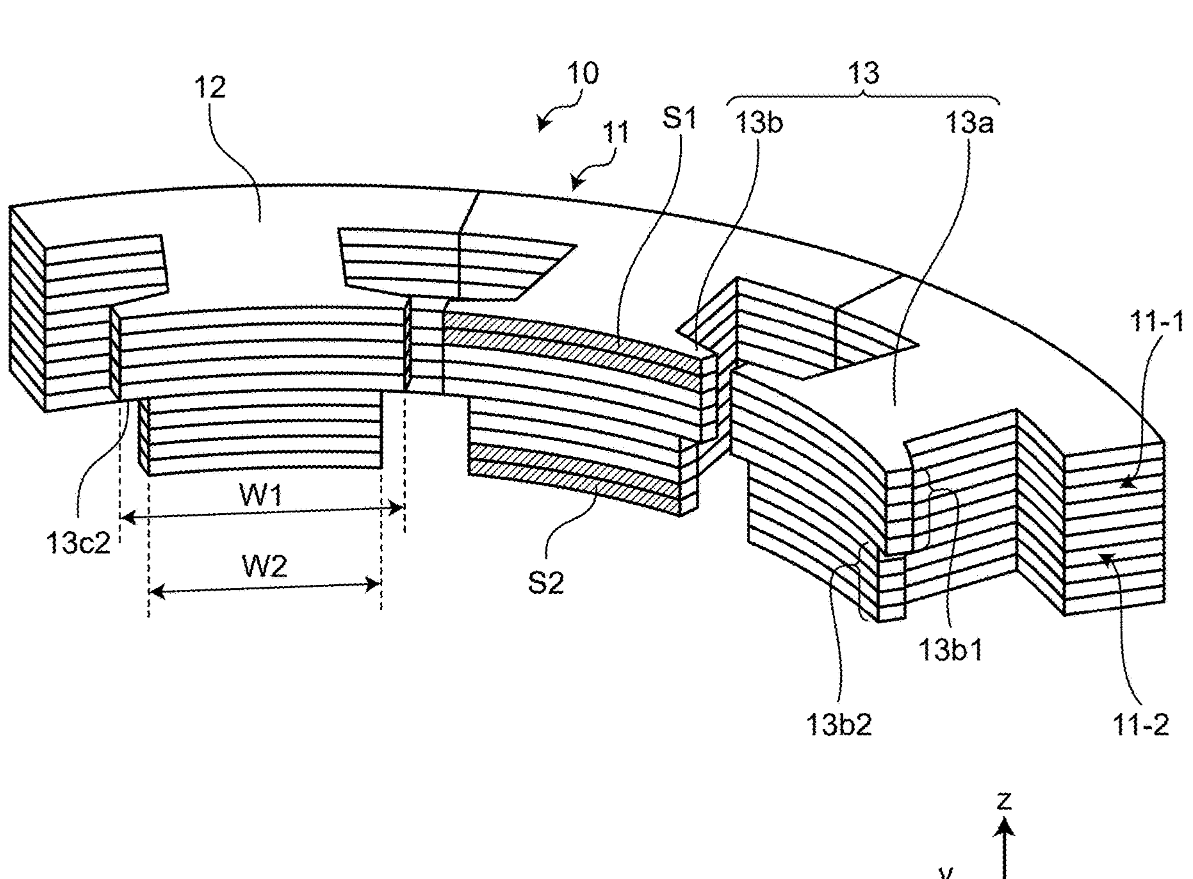
FIG. 4 is a perspective view illustrating a partial configuration of a stator core of the electromagnetic rotary machinery of the first embodiment.
Figure 4:
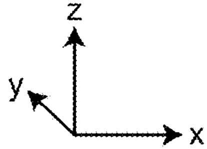

FIG. 4 is a perspective view illustrating a partial configuration of the stator core 11 of the electromagnetic rotary machinery of the first embodiment. The stator core 11 illustrated in FIG. 4 is an enlarged view of a partial configuration of the stator core 11 of the bearingless motor 1 illustrated in FIG. 1. Also, the stator core 11 illustrated in FIG. 4 is an enlarged view of a partial configuration of the stator core 11 of the magnetic bearing 3 illustrated in FIGS. 2 and 3. The winding (not illustrated) is wound around the tooth body 13*a* of the teeth 13 and energized to generate the electromagnetic bearing force in the radial direction in the rotor 20, whereby torque can be generated such that the rotor 20 rotates.

As illustrated in FIG. 4, the tooth tip **13*b* has the flanged structure in which a width dimension in the circumferential direction is increased such that a large amount of magnetic flux can pass between the tooth tip 13*b* and the rotor 20 in the gap 2. In the first embodiment, the tooth tip 13*b* includes two different width dimensions in the vertical direction. That is, the tooth tip 13*b* includes the upper tooth tip 13*b*1 as a first tooth tip on a positive side in the axial direction (positive side in the z direction) and the lower tooth tip 13*b*2 as a second tooth tip on a negative side in the axial direction (negative side in the z direction). In other words, each of the teeth 13 includes a first tooth as an upper tooth including the upper tooth tip 13*b*1 as the first tooth tip, and a second tooth as a lower tooth including the lower tooth tip 13*b*2 as the second tooth tip. In yet other words, the stator core 11 includes an upper stator core 11-1 including the upper tooth tip 13*b*1 and a lower stator core 11-2 including the lower tooth tip 13*b*2**.

A width W1 of the upper tooth tip **13*b*1 is wider than a width W2 of the lower tooth tip 13*b*2. That is, in the first embodiment, the width dimension of the tooth tip 13*b* is reduced in one direction from one end side in the axial direction where the upper tooth tip 13*b*1 lies to another end side in the axial direction where the lower tooth tip 13*b*2 lies. As a result, a cross-sectional area of the magnetic circuit S2 in the lower tooth tip 13*b*2 is smaller than a cross-sectional area of the magnetic circuit S1 in the upper tooth tip 13*b*1 per unit axis length. In FIG. 4, two layers of the laminated structure correspond to the unit axis length. The cross-sectional area of the magnetic circuit S1 that is hatched corresponds to an area per unit axis length of a of the upper tooth tip 13*b*1 facing the rotor 20. The cross-sectional area of the magnetic circuit S2 that is hatched corresponds to an area per unit axis length of a portion of the lower tooth tip 13*b*2 facing the rotor 20**.

That is, the permeance P of the magnetic flux flowing through the lower tooth is smaller than the permeance P of the magnetic flux flowing through the upper tooth. In this structure, since gap surfaces of the stator 10 and the rotor 20 do not have a tapered shape as in Patent Literature 1, the rotor 20 does not come into contact with the stator 10 even when the rotor 20 moves in the axial direction. Note that a tooth tip may be provided in addition to the upper tooth tip **13*b*1 and the lower tooth tip 13*b*2 while satisfying the condition that the circumferential width of the tooth tip 13*b*, which is the tip of the teeth 13, decreases in one direction from one end side to the other end side in the axial direction. For example, between the upper tooth tip 13*b*1 and the lower tooth tip 13*b*2, a middle tooth tip having a shorter circumferential width than the upper tooth tip 13*b*1 and a longer circumferential width than the lower tooth tip 13*b*2 may be provided. Also, on the negative side in the axial direction with respect to the lower tooth tip 13*b*2, a tooth tip having a shorter circumferential width than the lower tooth tip 13*b*2 may be provided. This will be described later with reference to FIG. 10**.

Figure 5:
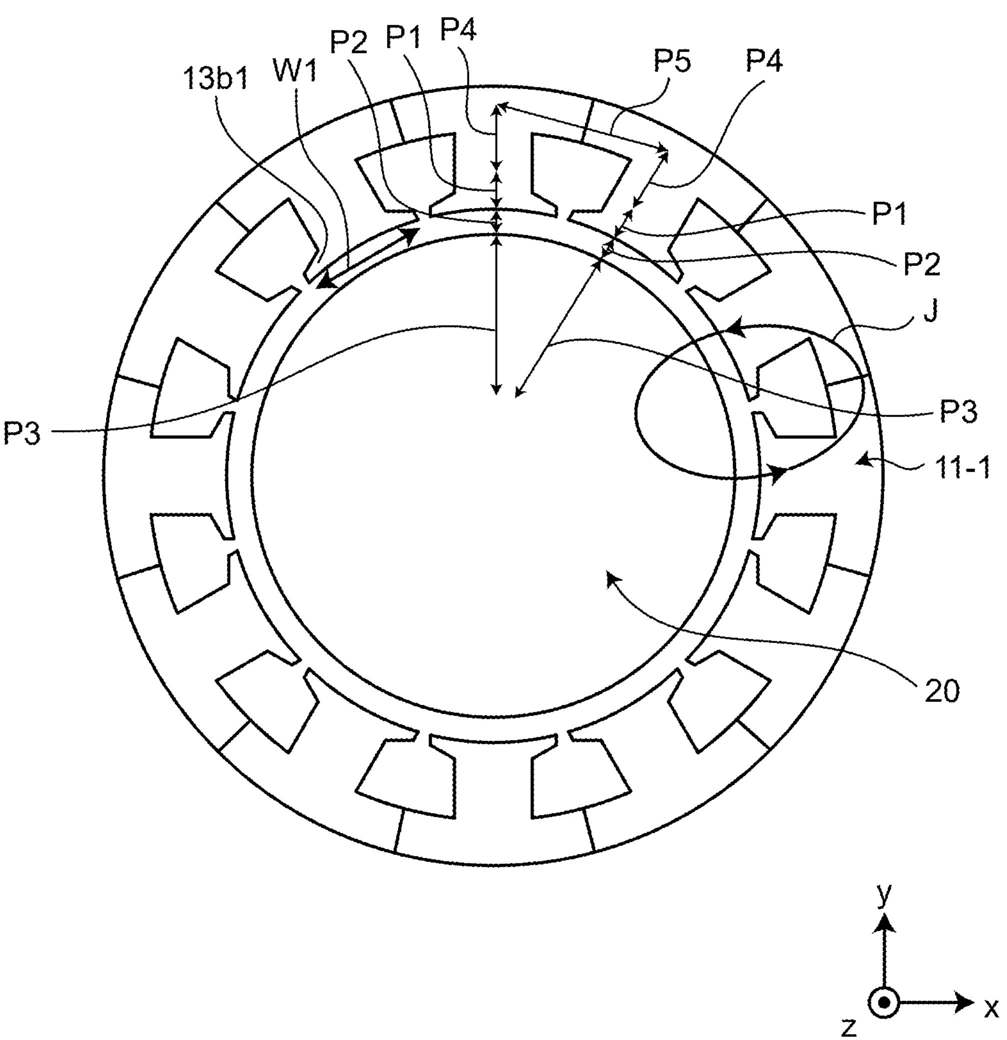
FIG. 5 is an xy cross-sectional view illustrating a configuration of an upper stator core of the electromagnetic rotary machinery of the first embodiment.

With reference to FIG. 5, the magnetic circuit and the permeance P in the upper stator core 11-1 will be described. FIG. 5 is an xy cross-sectional view illustrating a configuration of the upper stator core 11-1 of the electromagnetic rotary machinery of the first embodiment. As illustrated in FIG. 5, a loop magnetic circuit J that goes around the stator 10 and the rotor 20 via the gap 2 is formed. The loop magnetic circuit J can be mainly divided into two directions that are the radial direction and the circumferential direction. The loop magnetic circuit J has: tooth tip permeance P1; gap permeance P2; rotor permeance P3; tooth body permeance P4; and back yoke permeance P5. When the width W1 of the upper tooth tip **13*b*1 is increased, the cross-sectional area of the magnetic circuit to pass through the upper tooth tip 13*b*1 increases, and the permeance P of the tooth tip 13*b*** increases.

Figure 6:
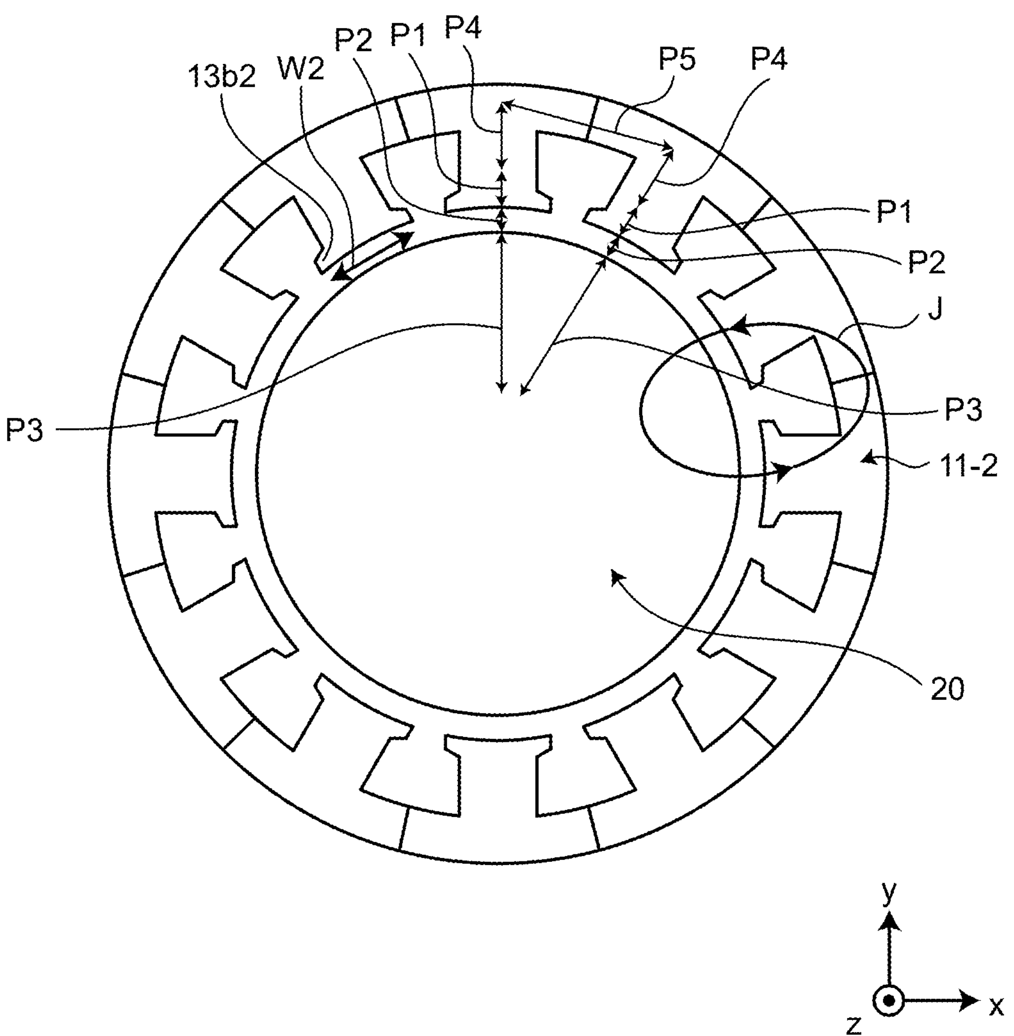
FIG. 6 is an xy cross-sectional view illustrating a configuration of a lower stator core of the electromagnetic rotary machinery of the first embodiment.

With reference to FIG. 6, the magnetic circuit and the permeance P in the lower stator core 11-2 will be described. FIG. 6 is an xy cross-sectional view illustrating a configuration of the lower stator core 11-2 of the electromagnetic rotary machinery of the first embodiment. In the lower stator core 11-2 as well, the loop magnetic circuit J has: the tooth tip permeance P1; the gap permeance P2; the rotor permeance P3; the tooth body permeance P4; and the back yoke permeance P5. As described above, the width W2 of the lower tooth tip **13*b*2 is narrower than the width W1 of the upper tooth tip 13*b*1. As a result, the cross-sectional area of the magnetic circuit to pass through the lower tooth tip 13*b*2 decreases, and the permeance P of the tooth tip 13*b*** decreases.

Figure 7:
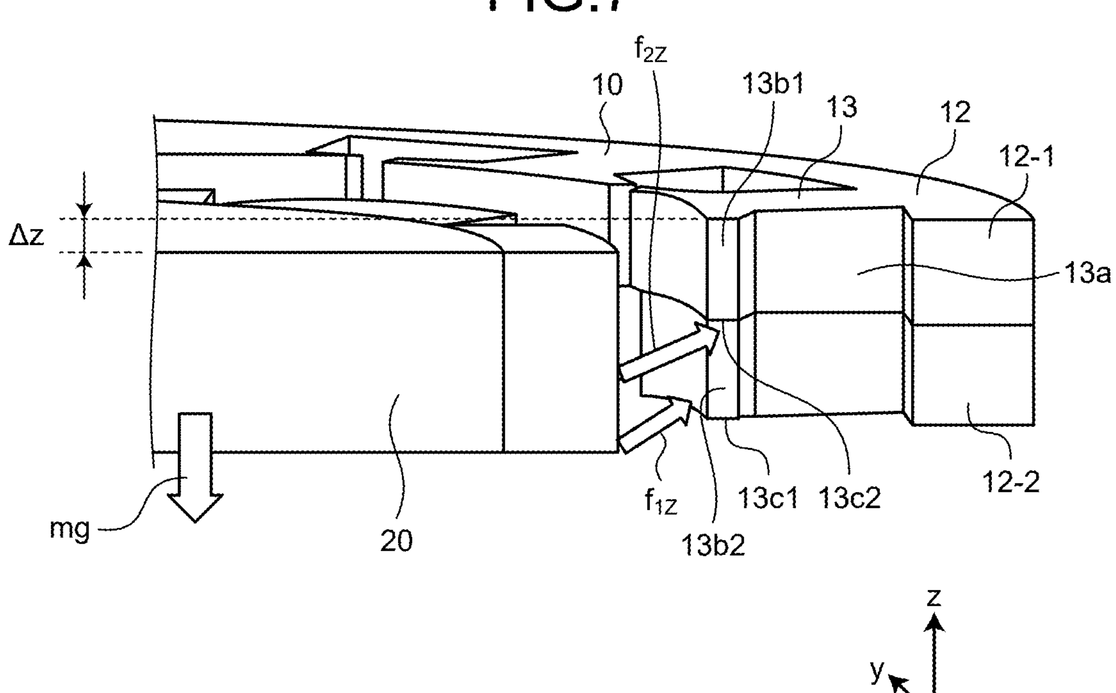
FIG. 7 is a perspective view illustrating a partial configuration of a stator and a rotor of the electromagnetic rotary machinery of the first embodiment.
Figure 8:
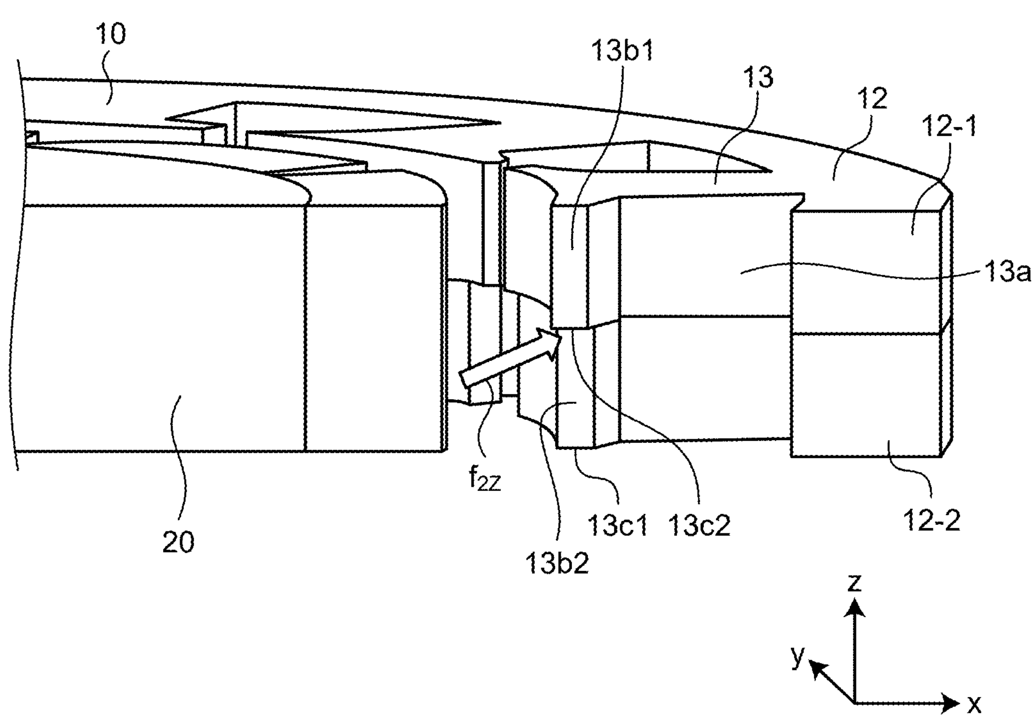
FIG. 8 is a perspective view illustrating a partial configuration of the stator and the rotor of the electromagnetic rotary machinery of the first embodiment.

FIG. 7 is a perspective view illustrating a partial configuration of the stator 10 and the rotor 20 of the electromagnetic rotary machinery of the first embodiment, and illustrates a state in which the rotor 20 is displaced by Δz in the axial direction. FIG. 8 is a perspective view illustrating the partial configuration of the stator 10 and the rotor 20 of the electromagnetic rotary machinery of the first embodiment, and illustrates a state in which the rotor 20 is not displaced in the axial direction. FIGS. 7 and 8 will be used to describe the principle of increasing the axial restoring force in a case where the tooth tip **13*b* has a two-tier structure including an upper tier and a lower tier. The stator 10 and the rotor 20** are illustrated as a model cut along the xz plane. Also for simplicity, lines indicating the laminated structure are not illustrated.

In a case where the electromagnetic rotary machinery is used for a fan, a blower, a pump, or the like, a reaction force acts on the rotor 20 when gas or liquid is fed through blades attached to the rotor 20. Moreover, regardless of the presence or absence of the blades, gravity "mg" due to the mass of the rotor 20 itself acts on the rotor 20. FIGS. 7 and 8 illustrate a case where the rotary shaft is disposed in the vertical direction, and the gravity "mg" of the rotor 20 acts in the axial direction. A vertically upward direction is defined as a positive z-axis direction. At this time, the rotor 20 tends to move in a vertically downward direction, that is, in a negative z-axis direction due to force such as the gravity "mg". However, as described above, when the rotor 20 is displaced in the axial direction, the axial restoring force fz is generated in the direction opposite to that of the displacement. Therefore, the rotor 20 levitates at a position where these forces are balanced. Since a part of the magnetic flux concentrates on a lower end **13*c*1 of the teeth 13, the axial restoring force $f_{1Z}$ is generated. The axial restoring force $f_{1Z}$ is also generated in a general configuration in which the width dimension of the tooth tip 13*b*** is not changed.

On the other hand, in the first embodiment, the width W1 of the upper tooth tip **13*b*1 is larger than the width W2 of the lower tooth tip 13*b*2, so that in a lower surface of the upper tooth tip 13*b*1, that is, in an intermediate 13*c*2 of the teeth 13 in the vertical direction, the flange of the upper tooth tip 13*b*1 protrudes further in the circumferential direction than the flange portion of the lower tooth tip 13*b*2, and thus the magnetic flux is also concentrated here. This is because there is a difference in the permeance P between the upper tooth and the lower tooth. In other words, this is because the permeance P decreases in one direction from one end side to the other end side in the axial direction. Therefore, the axial restoring force $f_{2Z}$ is also newly generated at the intermediate portion 13*c*2 in the vertical direction of the teeth 13. Thus, when the tooth tip 13***b* has the two-tier structure including the upper tier and the lower tier, the axial restoring force fz increases in one direction.

Note that, as illustrated in FIG. 8, in a case where the rotor 20 is not displaced in the axial direction, the axial restoring force $f_{1Z}$ is not generated, because the axial restoring force $f_{1Z}$ is generated when the rotor 20 and the stator 10 are not facing each other in the axial direction. However, the axial restoring force $f_{2Z}$ is generated by making the tooth tip 13*b* to have the two-tier structure of the upper tier and the lower tier. These will be described using mathematical expressions. When "$F_Z$" is a resultant force of the forces exerted by the rotor 20 in the axial direction, the resultant force $F_Z$ is a sum of the gravity "mg", disturbance "d" due to the reaction force and the like described above, the axial restoring force $f_{1Z}$, and the axial restoring force $f_{2Z}$, whereby an equation of motion in the axial direction is as follows.

$$F_Z = -mg + d + f_{1Z} + f_{2Z}$$

The axial restoring force $f_{1Z}$ is proportional to the axial displacement Δz. When "kz" is the restoring force coefficient in the axial direction, $f_{1Z} = -kz \cdot \Delta z$ is obtained. The negative sign means that the rotor 20 is attracted to the stator 10 in the direction opposite to the displaced direction. The axial restoring force $f_{2Z}$ is due to the magnetic flux between the stator 10 and the rotor 20 at the intermediate portion 13*c*2, which is hardly related to the axial displacement Δz of the rotor 20 and can be regarded as a constant. When the width W1 of the upper tooth tip 13*b*1 is made larger than the width W2 of the lower tooth tip 13*b*2, $f_{2Z} > 0$ is satisfied. Therefore, the equation of motion in the axial direction is as follows.

$$F_Z = -mg + d - kz \cdot \Delta z + f_{2Z}$$

The balance position is a value of Δz when $F_Z = 0$. This can be expressed as follows.

$$\Delta z = (-mg + d + f_{2Z})/kz$$

In a case where the width of the tooth tip 13*b* is constant and the axial restoring force $f_{2Z}$ is zero, Δz=(−mg+d)/kz holds, and the balance position is shifted in the axial direction by the amount corresponding to the gravity "mg" and the disturbance "d". However, when $f_{2Z} > 0$ as in the first embodiment, the balance position approaches Δz=0. When the axial restoring force $f_{2Z}$ is balanced with the sum of the gravity "mg" of the rotor 20 and the disturbance "d" to satisfy $f_{2Z} = mg - d$, the rotor 20 can keep being levitated at the position of Δz=0. Hereinafter, for the sake of simplicity, it is assumed that the disturbance "d" is d=0.

Figure 9:
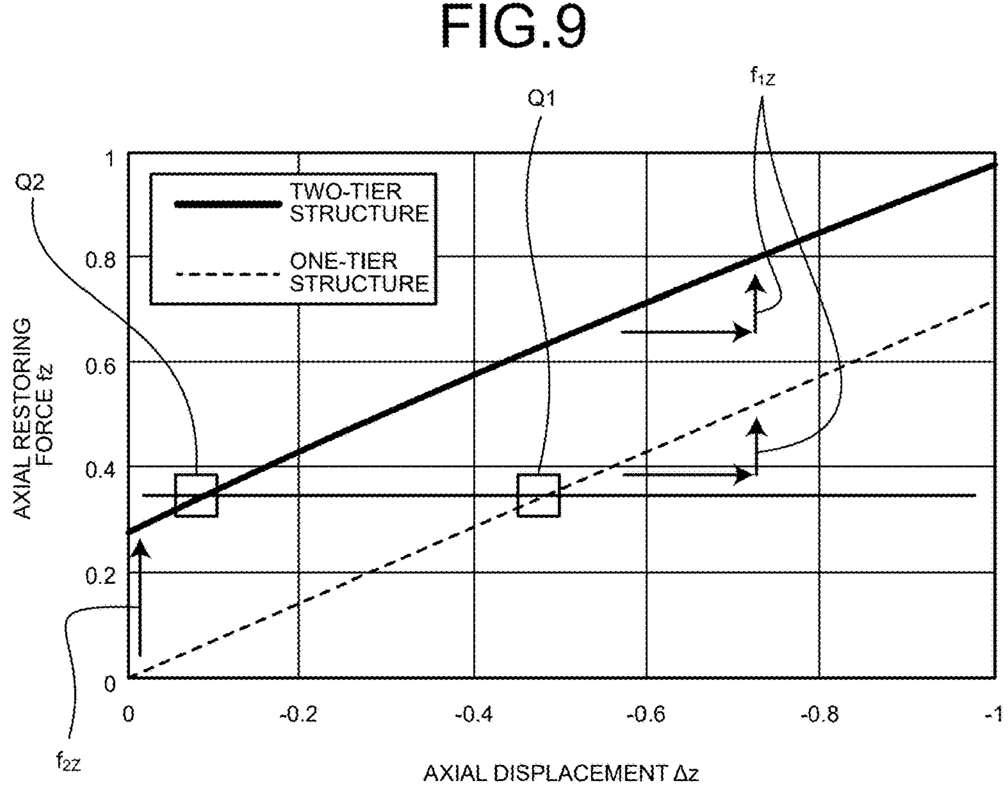
FIG. 9 is a graph illustrating a relationship between an axial displacement and an axial restoring force in the electromagnetic rotary machinery of the first embodiment and a comparative example.

FIG. 9 is a graph illustrating a relationship between the axial displacement and the axial restoring force in the electromagnetic rotary machinery of the first embodiment and a comparative example. In FIG. 9, the horizontal axis represents the axial displacement Δz, and the further to the right along the horizontal axis, the greater the displacement of the rotor 20 to the negative side in the axial direction with respect to the origin. The vertical axis represents the axial restoring force fz, the value of which is the sum of the axial restoring force $f_{1Z}$ and the axial restoring force $f_{2Z}$. In FIG. 9, values on the vertical axis and the horizontal axis are normalized. The thick solid line corresponds to the case where the tooth tip 13*b* has the two-tier structure of the upper tier and the lower tier as illustrated in the first embodiment. The broken line corresponds to the comparative example and corresponds to the case where the width of the tooth tip 13*b* is constant. FIG. 9 illustrates a result of analyzing the relationship between the axial displacement and the axial restoring force by a finite element method.

It can be seen that in both the one-tier structure (comparative example) and the two-tier structure (first embodiment), the axial restoring force increases as the axial displacement increases. This is due to the influence of the axial restoring force $f_{1Z}$ described above. In addition, the relationship in the two-tier structure (first embodiment) is further offset from the relationship in the one-tier structure (comparative example) and increased by a certain value. This increase corresponds to the influence of the axial restoring force $f_{2Z}$. As the balance position with respect to the gravity, a horizontal line may be drawn to calculate a point at which the gravity and the axial restoring force overlap. In the graph, "Q1" is the balance position of the comparative example, and "Q2" is the balance position of the first embodiment. According to this analysis result, it can be seen that the balance position of the first embodiment is closer to the origin than that of the comparative example.

Figure 10:
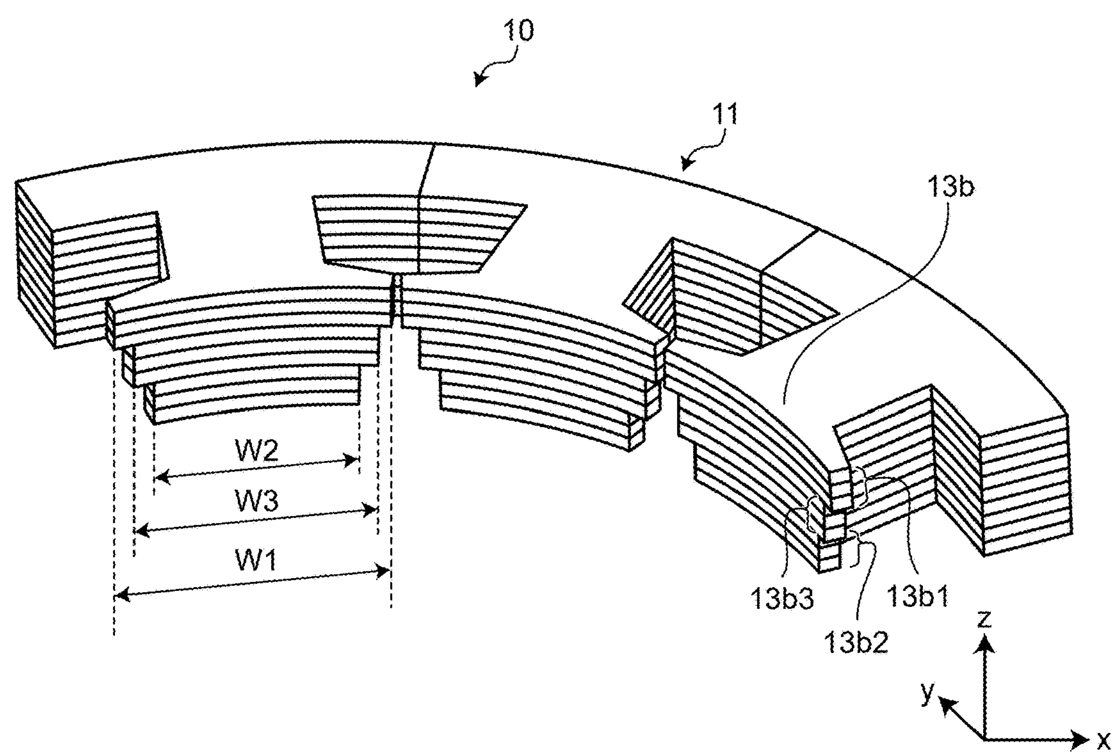
FIG. 10 is a perspective view illustrating a partial configuration of a modification of the stator core of the electromagnetic rotary machinery of the first embodiment.

FIG. 10 is a perspective view illustrating a partial configuration of a modification of the stator core 11 of the electromagnetic rotary machinery of the first embodiment. As described above, the number of tiers in which the width dimension of the tooth tip 13*b* is changed may be three or more instead of two. In FIG. 10, the tooth tip 13*b* includes the upper tooth tip 13*b*1, a middle tooth tip 13*b*3, and the lower tooth tip 13*b*2, and satisfies a relationship of "width W1 of the upper tooth tip 13*b*1">" width W3 of the middle tooth tip 13*b*3">"width W2 of the lower tooth tip 13*b*2". Alternatively, the width dimensions of the tooth tips of all the laminated steel plates may be changed not in tiers but linearly.

Although the above description has described the inner rotor type with the stator 10 disposed on the outer side and the rotor 20 disposed on the inner side, the first embodiment may also be applied to an outer rotor type with the stator 10 disposed on the inner side and the rotor 20 disposed on the outer side. That is, in this case, the width dimension of the tooth tip 13*b* of the stator 10 of the outer rotor type is changed in one direction of the z direction in a plurality of tiers or linearly, so that an effect similar to that described above can be obtained.

Moreover, the above description has described the case where the rotor 20 includes the permanent magnets and the stator 10 includes the iron core, but the first embodiment may also be applied to a case where the rotor 20 includes the iron core and the stator 10 includes the permanent magnets. In this case, the width dimension of the tooth tip of the tooth of the rotor of the inner rotor type or the outer rotor type is changed in one direction of the z direction in a plurality of tiers or linearly, so that an effect similar to that described above can be obtained.

Moreover, the above description has described the case where, with the gravity "mg" of the rotor 20 assumed, the tooth tip 13*b* has the multi-tier structure such that the axial restoring force $f_{2Z}$ is generated in the direction opposite to that of the gravity "mg" of the rotor 20, but the structure can also support forces other than the gravity "mg". For example, a reaction in the axial direction is generated also in a pump that circulates liquid with blades attached to the rotor 20. Since the direction of the reaction force is determined to be in one direction in advance, the width dimension of the tooth tip 13*b* need only be shortened in one direction such that the axial restoring force increases in a direction opposite to the direction of the reaction.

Moreover, FIG. 1 illustrates the surface magnet type in which the permanent magnets 22 are disposed on the surface of the rotor 20, but the first embodiment may also be applied to an embedded magnet type in which the permanent magnets 22 are disposed in the core of the rotor 20. The first embodiment may also be applied to a motor using reluctance torque without the permanent magnets 22 disposed on the side of the rotor 20.

Moreover, the axial length (length in the axial direction) of the rotor 20 is desirably designed to be shorter than the length of the radius of the rotor 20. This increases the restoring force coefficient "kz" and the axial restoring force $f_{1Z}$. Furthermore, the effect of the axial restoring force $f_{2Z}$ is also added, so that the balance position is closer to the origin.

Figure 11:
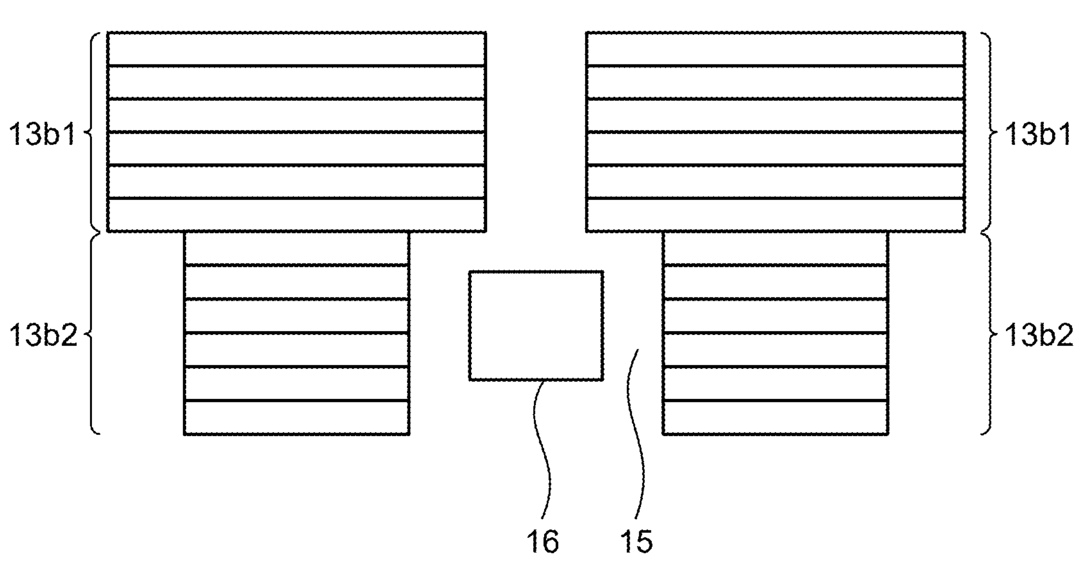
FIG. 11 is a developed view illustrating a configuration of a modification of the electromagnetic rotary machinery of the first embodiment.

FIG. 11 is a developed view illustrating a configuration of a modification of the electromagnetic rotary machinery of the first embodiment. In FIG. 11, a sensor 16 is disposed in a region 15 between the lower tooth tips 13*b*2 adjacent to each other. Since the region 15 between the lower tooth tips 13*b*2 adjacent to each other has a wider slot opening, the space for disposing various components can be secured. In the region 15, a base or a holder for the sensor 16, wiring for the sensor 16, a connecting wire for windings, or a refrigerant pipe for cooling may be disposed. In addition, the sensor 16 for detecting an ambient temperature, magnetic flux density, or a distance to the rotor 20 may be disposed. The sensor 16 may be a Hall element, a thermocouple, or an eddy current displacement sensor. In this case, on the lower tier side where the slot opening is widened, the magnetic flux from the permanent magnets 22 of the rotor 20 to the sensor of the Hall element or the magnetic flux from the eddy current sensor to the rotor 20 is easily transmitted. This is because when the flange portion of the teeth 13 protrudes greatly, the magnetic flux flows to the flange portion so that the sensitivity of the sensor 16 decreases, but this phenomenon can be suppressed by widening the slot opening on the lower tier side. Note that, as in FIG. 10, in the case where three or more tiers of the tooth tips are included, it is difficult to place the sensor 16 on the side of the upper tooth tip 13*b*1 in terms of space, but a similar effect can be obtained by disposing the sensor 16 on the side of the middle tooth tip 13*b*3 or the side of the lower tooth tip 13*b*2. At this time, when the sensor 16 is placed on the side of the lower tooth tip 13*b*2 corresponding to the widest slot opening, the above-described effect can be obtained the most.

As described above, according to the first embodiment, the permeance P, which is the amount representing the ease of flowing of the magnetic flux, of at least one of the gap and the iron core in the loop magnetic circuit J that goes around the stator 10 and the rotor 20 along the radial direction and the circumferential direction decreases in one direction from one end side to the other end side in the axial direction, or, specifically, the width dimension of the tooth tip 13*b* of the teeth 13 is changed in one direction of the z direction in a plurality of tiers or linearly. Therefore, the gap surface between the stator 10 and the rotor 20 does not need to be tapered or the like, and the axial restoring force of the rotor 20 can be increased in one direction without deteriorating assemblability and disassemblability. In addition, since the clearance of the gap between the rotor 20 and the stator 10 can remain small, the magnetic flux easily passes between the stator 10 and the rotor 20, and the current necessary for generating the same torque and bearing force can be reduced. As a result, effects such as a decrease in the amount of heat generated and an increase in the efficiency can be obtained.

Moreover, according to the first embodiment, the axial restoring force $f_{2Z}$ can be generated even when the rotor 20 is not displaced in the axial direction. As illustrated in FIG. 8, when the gravity "mg" of the rotor 20 and the axial restoring force $f_{2Z}$ are balanced in the state where the rotor 20 is not displaced in the axial direction, all regions of the stator 10 and the rotor 20 in the axial direction face each other. Therefore, the bearing force and the torque generated are increased when the equal current flows to the stator 10 and the rotor 20. This as a result can reduce the copper loss in generating the same bearing force and torque.

Furthermore, according to the first embodiment, only the width of the tooth tip 13*b* is changed without changes in the inner diameter of the stator 10 and the outer diameter of the rotor 20, whereby the movable range of the rotor 20 is not reduced at all. That is, if the inner diameter of the stator 10 or the outer diameter of the rotor 20 is changed, when the rotor 20 is displaced in the radial direction, the axial direction, or the inclination direction, the rotor 20 and the stator 10 come into contact with each other at a portion where they protrude toward each other or a portion where the gap is narrow, which causes a problem that the movable range of the rotor 20 is reduced. Without generating such a disadvantage, the first embodiment can increase the force in the axial direction generated in the rotor 20.

Second Embodiment

Figure 12:
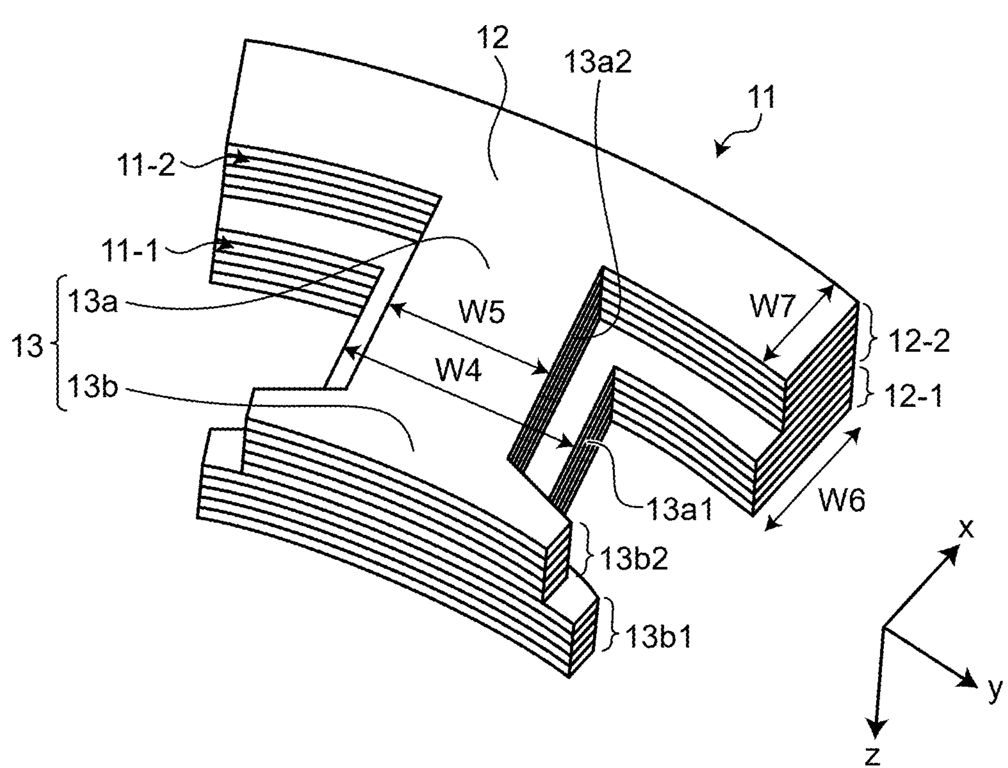
FIG. 12 is a perspective view illustrating a partial configuration of a stator core of an electromagnetic rotary machinery of a second embodiment.

FIG. 12 is a perspective view illustrating a partial configuration of the stator core 11 of an electromagnetic rotary machinery of a second embodiment. In FIG. 12, for better visibility, the direction of the z axis is flipped 180 degrees with respect to the case of FIGS. 1 to 4, and a perspective view as seen from below is illustrated. In the second embodiment, the tooth body 13*a* also has a tiered configuration of two or more tiers, and a circumferential width W4 of an upper tooth body 13*a*l as a first tooth body is larger than a circumferential width W5 of a lower tooth body 13*a*2 as a second tooth body. Moreover, the back yoke 12 also has a tiered configuration of two or more tiers, and a radial width W6 of an upper back yoke 12-1 as a first back yoke is larger than a radial width W7 of a lower back yoke 12-2 as a second back yoke.

Accordingly, the lower tier has a smaller cross-sectional area of the magnetic circuit and smaller permeance P than the upper tier. Therefore, the magnetic flux more easily passes between the upper tier of the stator 10 and the rotor 20 than between the lower tier of the stator 10 and the rotor 20, and the magnetic flux in the axial direction and the axial restoring force $f_{2Z}$ increase. As a result, when the structure of the second embodiment is adopted together with the change in the width dimension of the tooth tip 13*b*, the axial restoring force $f_{2Z}$ further increases. In addition, the width dimensions of the tooth body 13*a* and the back yoke 12 are reduced, which results in weight reduction of the entire device.

Note that although FIG. 12 illustrates the case where the width dimensions of both the tooth body 13*a* and the back yoke 12 are changed, only one of the width dimensions may be changed. Moreover, although not illustrated in FIG. 12, the windings wound around the teeth 13 can have a shorter circumferential length due to the reduction in the width dimensions of the lower tier side.

Therefore, the resistance and copper loss can be reduced. Moreover, the angle of winding the windings on the lower tier side is larger than 90 degrees, which reduces the bulkiness of the windings. This as a result can reduce the area of the end portion of the windings, and can achieve reduction in size and weight of the entire device in addition to the aforementioned reduction in the copper loss. Moreover, when the tooth tip 13*b* has different widths, the effect described in the first embodiment can also be obtained. However, the tooth tip 13*b* does not need to have different widths.

In addition, the width W5 of the lower tooth body 13*a*2 is reduced, and the bulkiness of the winding is also suppressed, so that the slot space between the lower tooth bodies 13*a*2 can be secured. As a result, as in the first embodiment, the sensor 16, other holders, and the like can be disposed at this position. Moreover, in a case where the sensor 16 is long in the radial direction and needs to be disposed in the space between the tooth tips 13*b* and the space between the tooth bodies 13*a*, the space for the sensor 16 can be secured for the entire length thereof.

As described above, according to the second embodiment, in order to reduce the permeance P in one direction from one end side to the other end side in the axial direction, the circumferential width W4 of the upper tooth body 13*a*1 is made larger than the circumferential width W5 of the lower tooth body 13*a*2, and the radial width W6 of the upper back yoke 12-1 is made larger than the radial width W7 of the lower back yoke 12-2. Therefore, the axial restoring force of the rotor 20 can be increased in one direction without deteriorating the assemblability and disassemblability, and the position of disposing the sensor 16 can be secured.

Third Embodiment

Figure 13:
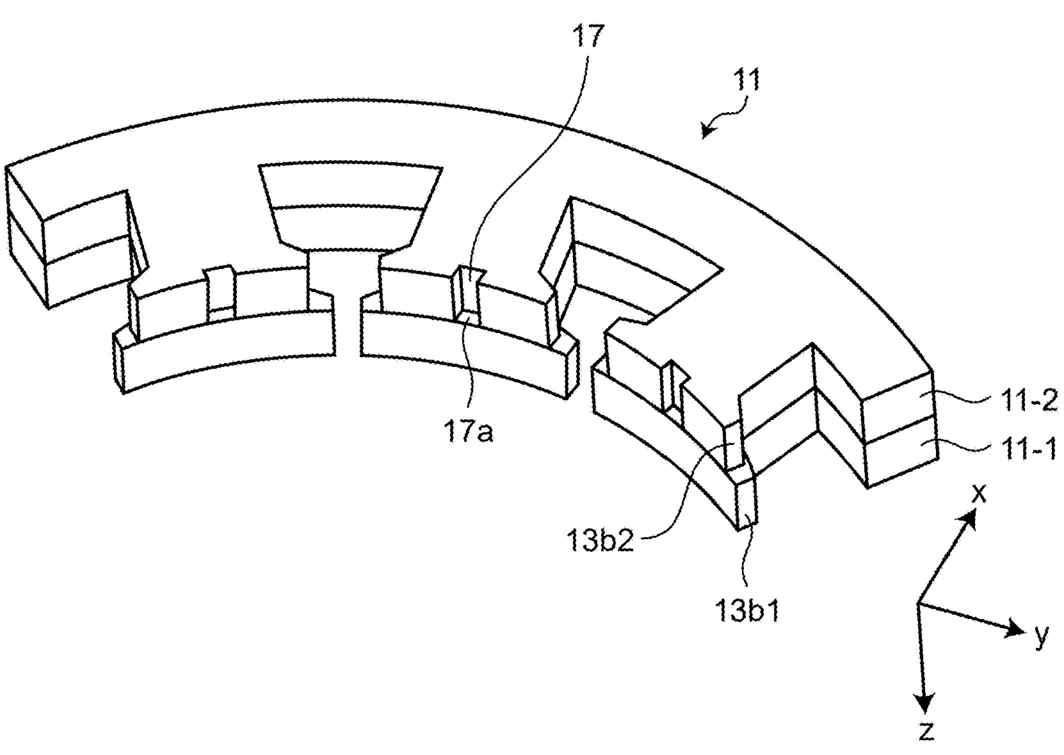
FIG. 13 is a perspective view illustrating a partial configuration of a stator core of an electromagnetic rotary machinery of a third embodiment.
Figure 14:
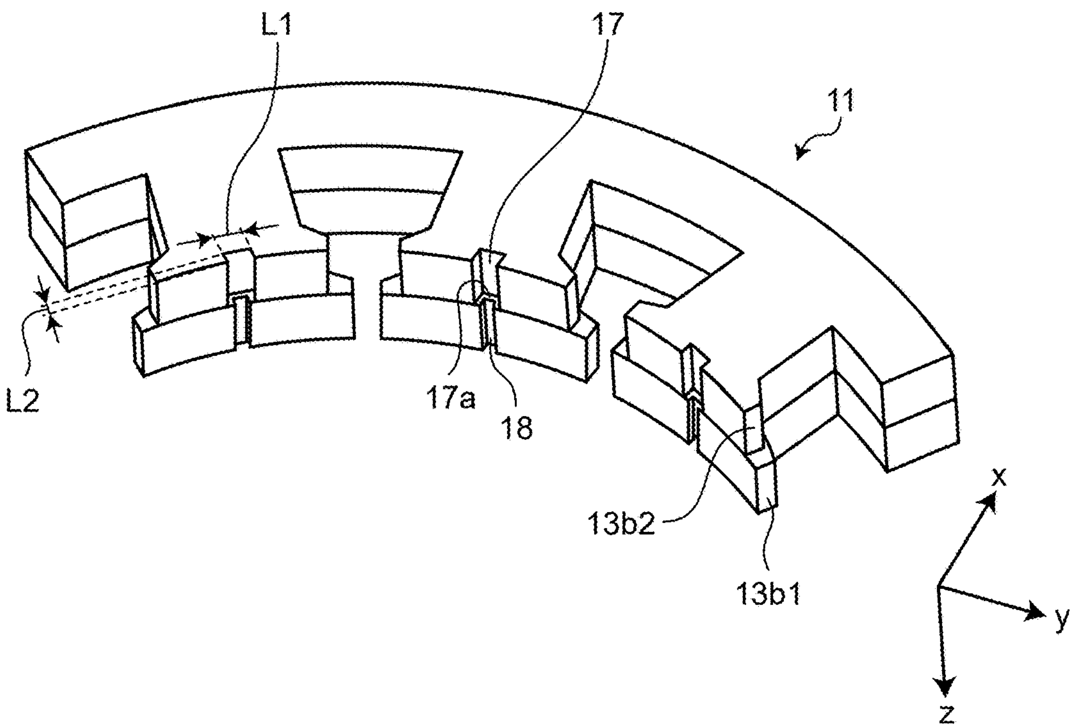
FIG. 14 is a perspective view illustrating a partial configuration of a modification of the stator core of the electromagnetic rotary machinery of the third embodiment.

FIG. 13 is a perspective view illustrating a partial configuration of the stator core 11 of an electromagnetic rotary machinery of a third embodiment. FIG. 14 is a perspective view illustrating a partial configuration of a modification of the stator core 11 of the electromagnetic rotary machinery of the third embodiment. In FIGS. 13 and 14, as in FIG. 12, the perspective view of the stator core 11 as seen from below is illustrated. Moreover, for simplicity, lines indicating the laminated structure are not illustrated.

In FIG. 13, a groove 17 is provided in a gap surface of the lower tooth tip 13*b*2 facing the rotor 20. The groove 17 is a slot with no winding wound therein, and thus is also referred to as a dummy slot. In FIG. 13, the groove 17 is provided only in the lower tier so that, on the upper tier side of the groove 17, an upper exposed surface 17*a* is formed where a part of the upper tooth tip 13*b*1 is exposed. According to this configuration, magnetic flux obliquely passing between the upper exposed surface 17*a* of the upper tooth tip 13*b*1 and the rotor 20 is generated, so that the axial restoring force $f_{2Z}$ further increases as a result. This can also be understood that the groove 17 makes it difficult for the magnetic flux to pass through a part of the lower tooth tip 13*b*2, and causes a reduction in the permeance P.

In FIG. 14, the groove 17 as a second groove is provided in the gap surface of the lower tooth tip 13*b*2, and a groove 18 as a first groove is provided in a gap surface of the upper tooth tip 13*b*1. The dimension of the groove 17 is larger than the dimension of the groove 18. The dimension of the groove 17 is a width dimension L1 or a depth dimension L2, where both or only one of these dimensions may be varied. As a result, as in FIG. 13, the upper exposed surface 17*a* can be generated.

As described above, according to the third embodiment, in order to reduce the permeance P in one direction from one end side to the other end side in the axial direction, the groove 17 is provided in the gap surface of the lower tooth tip 13*b*2, which can not only increase the restoring force in the axial direction but also adjust the waveform or peak value of cogging torque generated between the stator 10 and the rotor 20 even when no current is applied. As it is usually desirable that the cogging torque is small, a reduction in the cogging torque can be achieved at the same time. Moreover, when the tooth tip 13*b* or the tooth body 13*a* has different widths, the effects described in the first and second embodiments can also be obtained. However, forming the groove 17 alone can increase the axial restoring force in one direction.

Fourth Embodiment

Figure 15:
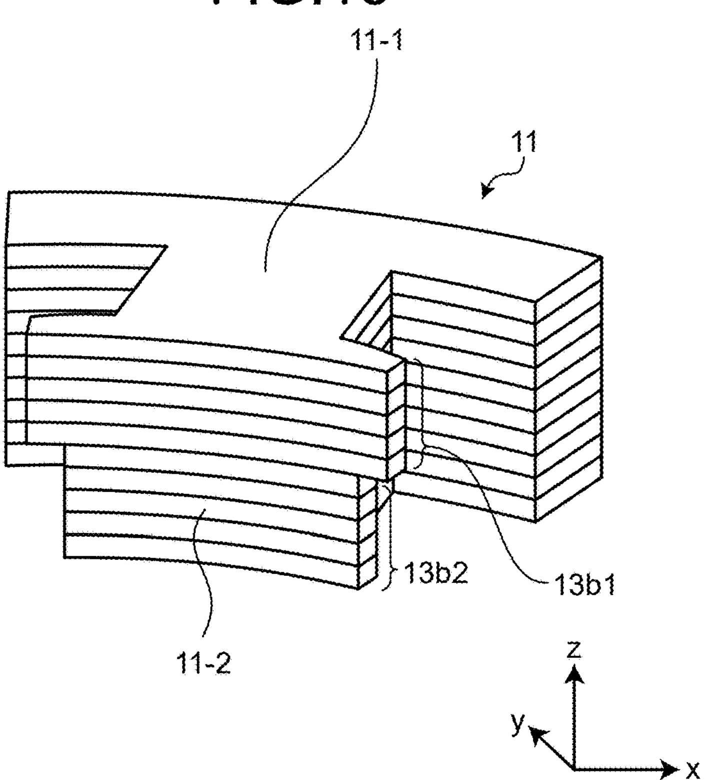
FIG. 15 is a perspective view illustrating a partial configuration of a stator core of an electromagnetic rotary machinery of a fourth embodiment.

FIG. 15 is a perspective view illustrating a partial configuration of the stator core 11 of an electromagnetic rotary machinery of a fourth embodiment. In the fourth embodiment, the upper stator core 11-1 and the lower stator core 11-2 use different materials. The upper stator core 11-1 uses a high flux density material, and the lower stator core 11-2 uses a low flux density material, whereby the magnetic flux density of the upper stator core 11-1 is higher than the magnetic flux density of the lower stator core 11-2. The upper stator core 11-1 includes the upper tooth tip 13*b*1, and the lower stator core 11-2 includes the lower tooth tip 13*b*2, where the width of the upper tooth tip 13*b*1 is larger than the width of the lower tooth tip 13*b*2. The high flux density material refers to, for example, a material having a higher magnetic flux density value than another material when magnetic field strength is equal. For example, an oriented electrical steel sheet may be used for the upper stator core 11-1, and a non-oriented electrical steel sheet may be used for the lower stator core 11-2. In addition, the characteristics of the magnetic flux density with respect to the magnetic field strength of the entire region may be changed by changing the space factor of the laminated steel plates. This means to set a difference in the space factor by, for example, setting the space factor of the upper stator core 11-1 to 96% and setting the space factor of the lower stator core 11-2 to 92%, so that the magnetic characteristics of the entire region can be changed even if the laminated steel plates are made of the same material. This change can be said to be a change in the permeability. As described above, the permeance P is also a function of the permeability so that, consequently, the permeance P can be changed in the axial direction.

Thus, according to the fourth embodiment, in order to reduce the permeance P in one direction from one end side to the other end side in the axial direction, the upper stator core 11-1 has the magnetic flux density higher than the magnetic flux density of the lower stator core 11-2, whereby the magnetic flux is more concentrated on the side of the upper stator core 11-1, which increases the magnetic flux obliquely flowing through the gap 2. As a result, the axial restoring force $f_{2Z}$ generated between the rotor 20 and the stator 10 further increases. Note that although it is desirable to apply the contrived shapes described in the first to third embodiments, the change in the material alone can obtain the effect.

Fifth Embodiment

Figure 16:
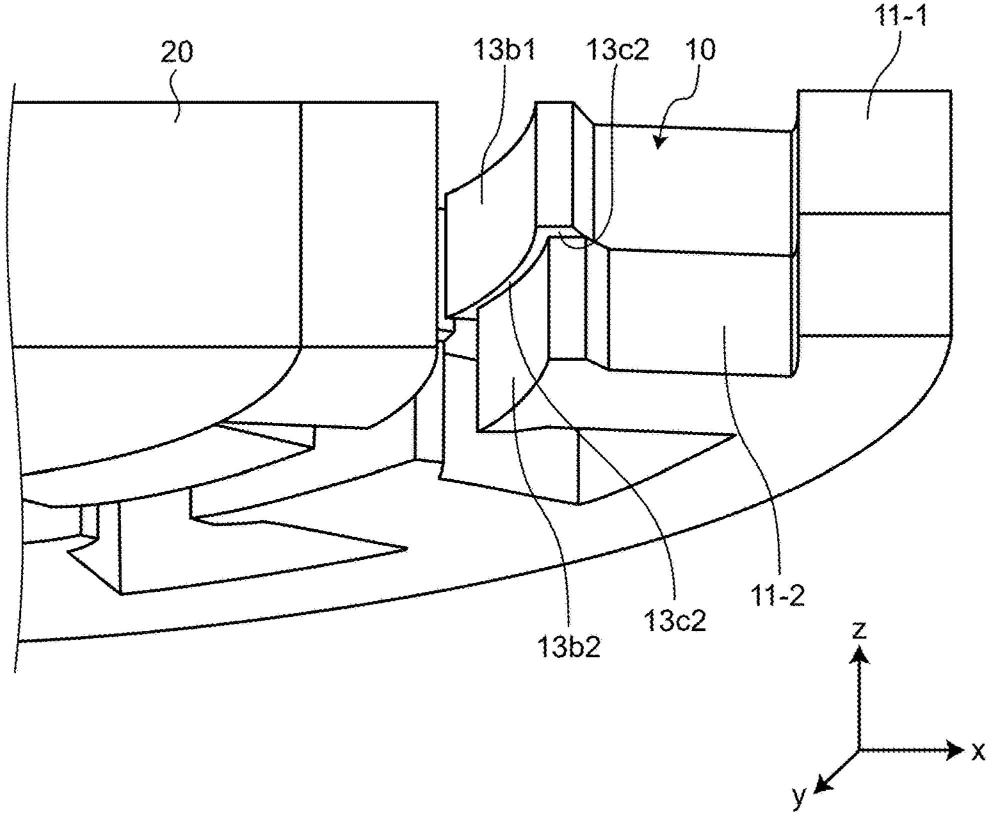
FIG. 16 is a perspective view illustrating a partial configuration of a stator and a rotor of an electromagnetic rotary machinery of a fifth embodiment.
Figure 17:
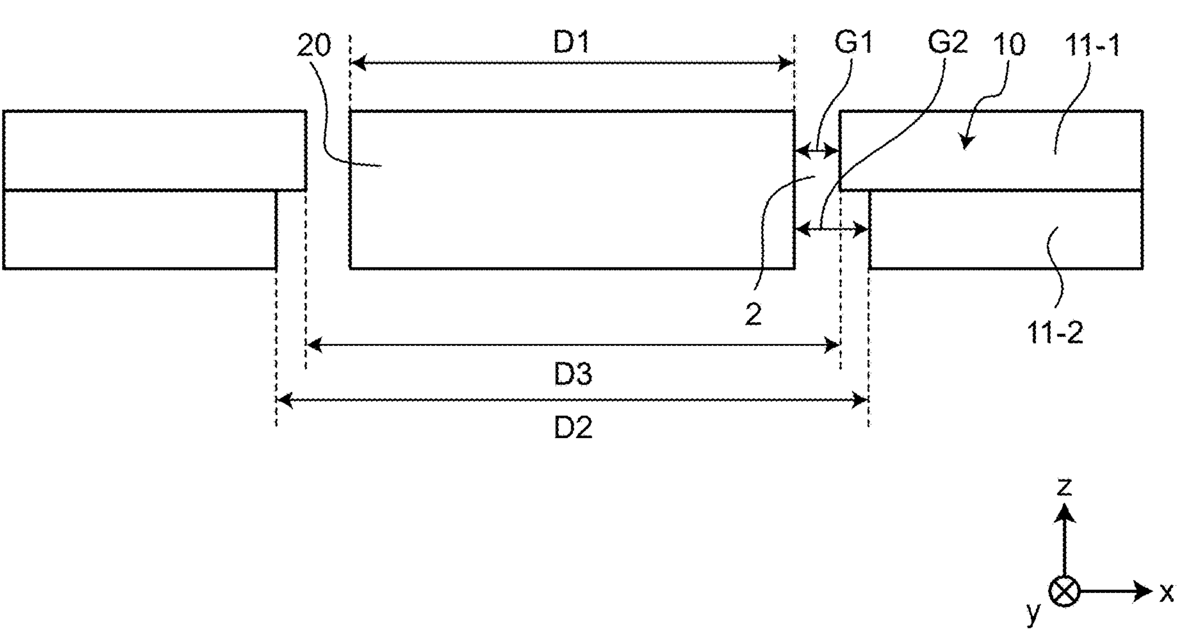
FIG. 17 is an xz cross-sectional view illustrating a configuration of the electromagnetic rotary machinery of the fifth embodiment.

FIG. 16 is a perspective view illustrating a partial configuration of a stator and a rotor of an electromagnetic rotary machinery of a fifth embodiment. FIG. 17 is an xz cross-sectional view illustrating a configuration of the electromagnetic rotary machinery of the fifth embodiment. In FIG. 16, for the sake of visibility, the perspective view as seen from a lower part in the axial direction is illustrated. In the fifth embodiment, the gap length between the inner diameter of the stator core 11 or the stator 10 and the rotor 20 is changed to be shorter in one direction in a plurality of tiers or linearly from one end side to the other end side in the axial direction. From a different perspective, this can also be said that the gap length is changed to be longer in one direction in a plurality of tiers or linearly from one end side to the other end side in the axial direction. Specifically, an inner diameter D3 of the upper stator core 11-1 and an inner diameter D2 of the lower stator core 11-2 are different, the inner diameter D3 of the upper stator core 11-1 being smaller than the inner diameter D2 of the lower stator core 11-2. The inner diameter of the stator core 11 is also referred to as the inner diameter of the tooth tip 13*b*. When an upper tooth of the teeth 13 is defined as a first tooth and a lower tooth of the teeth 13 is defined as a second tooth, it can be seen that the first tooth, which includes the first tooth tip, and the second tooth, which includes the second tooth tip with the inner diameter larger than that of the first tooth tip, are disposed in the axial direction. The gap in the second tooth is preferably wider than the gap in the first tooth, and the second tooth is preferably disposed on a vertically lower side. Note that the expression that the gap length is long or short is synonymous with the expression that the gap is wide or narrow.

In the fifth embodiment, the intermediate portion 13*c*2, which is the upper stator core 11-1 and can be visually identified as protruding more than the lower stator core 11-2, is formed not only in the circumferential direction but also in the radial direction. That is, a part of the magnetic flux flowing between the rotor 20 and the stator 10 obliquely passes through the radial part of the intermediate portion 13*c*2. Therefore, the force in the axial direction generated in the rotor 20 is increased by the presence of the radial part of the intermediate portion 13*c*2. Moreover, in the fifth embodiment, as described in the first embodiment, the width of the upper tooth tip 13*b*1 is larger than the width of the lower tooth tip 13*b*2, and the intermediate portion 13*c*2 in the circumferential direction is also formed. That is, when the width of the tooth tip 13*b* is changed between the upper tier and the lower tier, the force in the axial direction generated in the rotor 20 can be further increased. However, an effect similar to that of the first embodiment can be obtained only by changing the inner diameter of the stator core 11-2 between the upper tier and the lower tier without changing the width of the tooth tip 13*b* between the upper tier and the lower tier.

In the fifth embodiment, the inner diameter of the stator core 11 satisfies D3<D2. Also, when the outer diameter of the rotor 20 is D1, D1<D3 holds. Thus, even when the rotor 20 is moved in the axial direction, the rotor 20 does not come into contact with the stator 10. As a result, the assemblability and disassemblability is not deteriorated. Moreover, in Patent Literature 1, both the inner diameter of the stator 10 and the outer diameter of the rotor 20 are changed. This requires preparing a plurality of shapes of both the stator 10 and the rotor 20, and requires more manufacturing cost. However, in the fifth embodiment, the shape of only one of the stator 10 and the rotor 20 is changed, and thus an increase in the manufacturing cost can be suppressed. In particular, it is difficult to manufacture magnets having different diameters and magnets having an oblique shape. However, in the fifth embodiment, it is sufficient to change only the inner diameter of the stator core 11, and thus the manufacturing cost of the magnet does not increase. In addition, the difference between the inner diameter D3 and the inner diameter D2 of the stator 10 may be, for example, about 0.1 mm to 1 mm with almost no difference in shape. For example, the upper stator core 11-1 having a small inner diameter is made, and then a part thereof is additionally processed to obtain a wider inner diameter so that the lower stator core 11-2 can be made.

Such a change in the structure can also be described in terms of the gap length. The permeability of the gap 2 formed by air is sufficiently smaller than the permeability of the iron core. That is, the magnetic circuit length of the gap 2 greatly affects the permeance P. When the upper stator core 11-1 has a gap length G1 and the lower stator core 11-2 has a gap length G2, G1<G2 holds. That is, it can be seen that, since the magnetic circuit length of the gap 2 is short in the upper stator core 11-1 and is long in the lower stator core 11-2, the permeance P decreases in one direction from one end side to the other end side in the axial direction. In the fifth embodiment, the diameter of the rotor 20 is not changed. Therefore, even when the rotor 20 moves in the axial direction, the values of G1 and G2 are constant, and their magnitude relationship does not change, either.

Note that in the case of the outer rotor type with the stator 10 disposed on the inner side and the rotor 20 disposed on the outer side, changing the shape of the stator 10 depending on the position in the axial direction corresponds to changing the outer diameter of the stator 10.

As described above, according to the fifth embodiment, in order to decrease the permeance P in one direction from one end side to the other end side in the axial direction, the gap length between the inner diameter of the stator core or the stator 10 and the rotor 20 is changed to be shorter in one direction in the plurality of tiers or linearly from one end side to the other end side in the axial direction. Therefore, the axial restoring force of the rotor 20 can be increased in one direction without deteriorating the assemblability and disassemblability. In addition, since the clearance of the gap between the rotor 20 and the stator 10 can remain small, the magnetic flux easily passes between the stator 10 and the rotor 20, and the current necessary for generating the same torque and bearing force can be reduced. As a result, effects such as a decrease in the amount of heat generated and an increase in the efficiency can be obtained.

Sixth Embodiment

Figure 18:
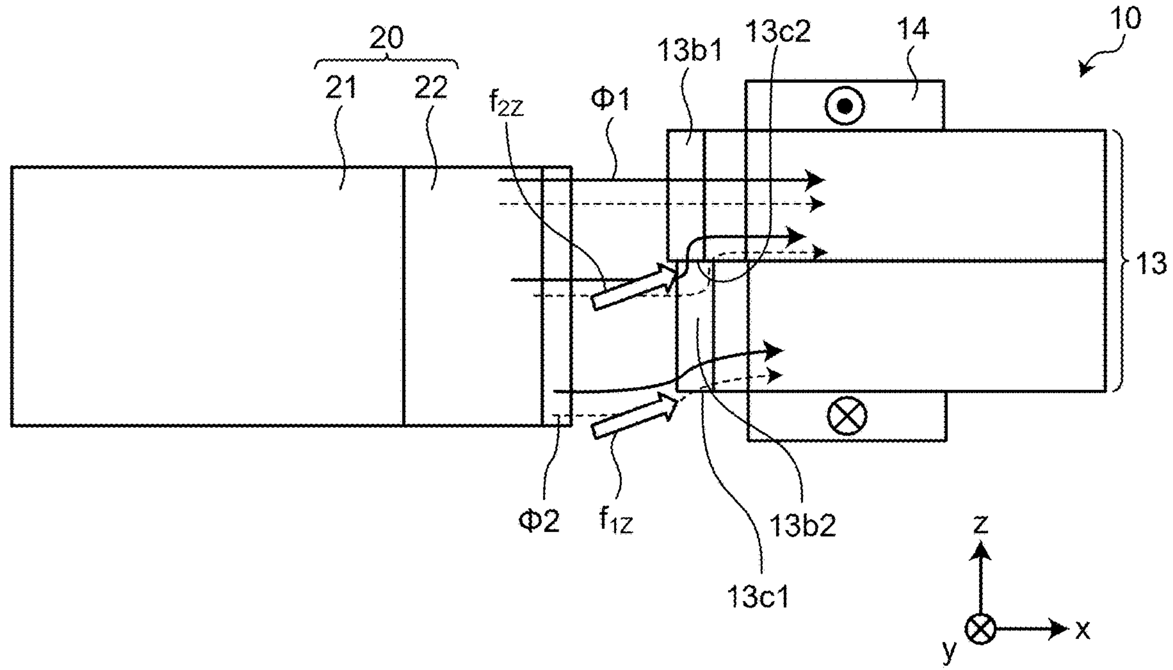
FIG. 18 is a diagram for explaining the principle of adjusting an axial restoring force of an electromagnetic rotary machinery of a sixth embodiment.
Figure 19:
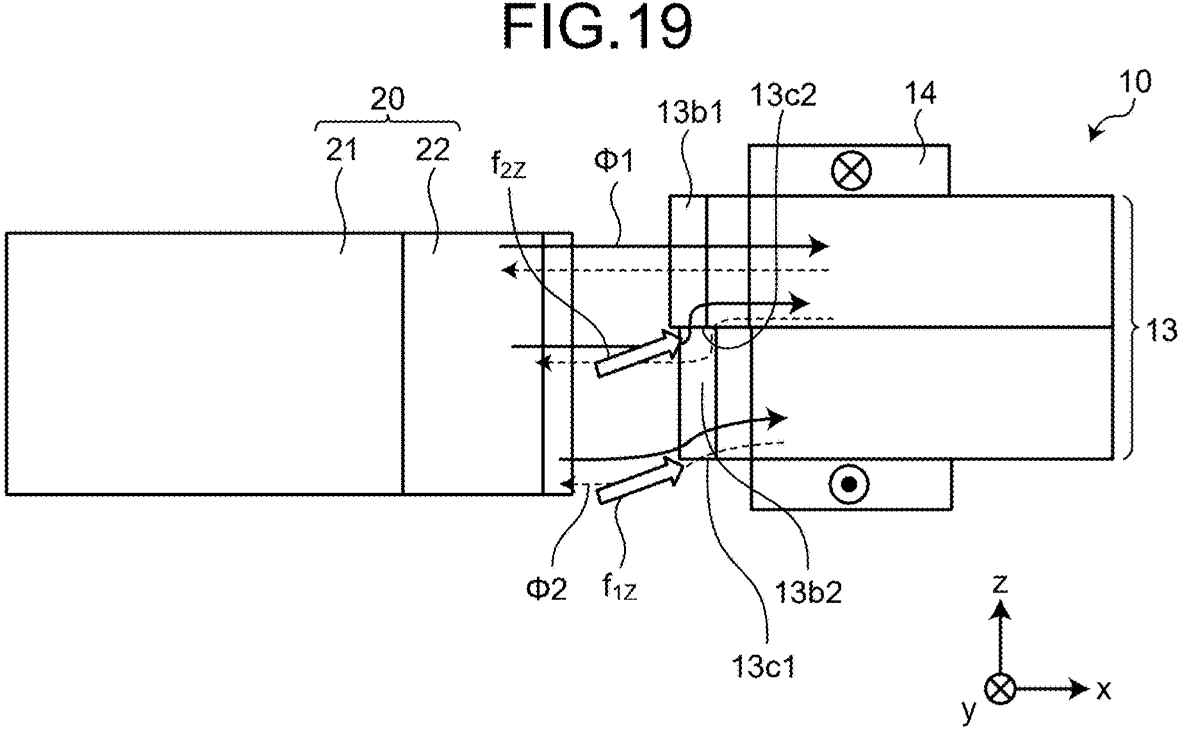
FIG. 19 is a diagram for explaining the principle of adjusting the axial restoring force of the electromagnetic rotary machinery of the sixth embodiment.
Figure 20:
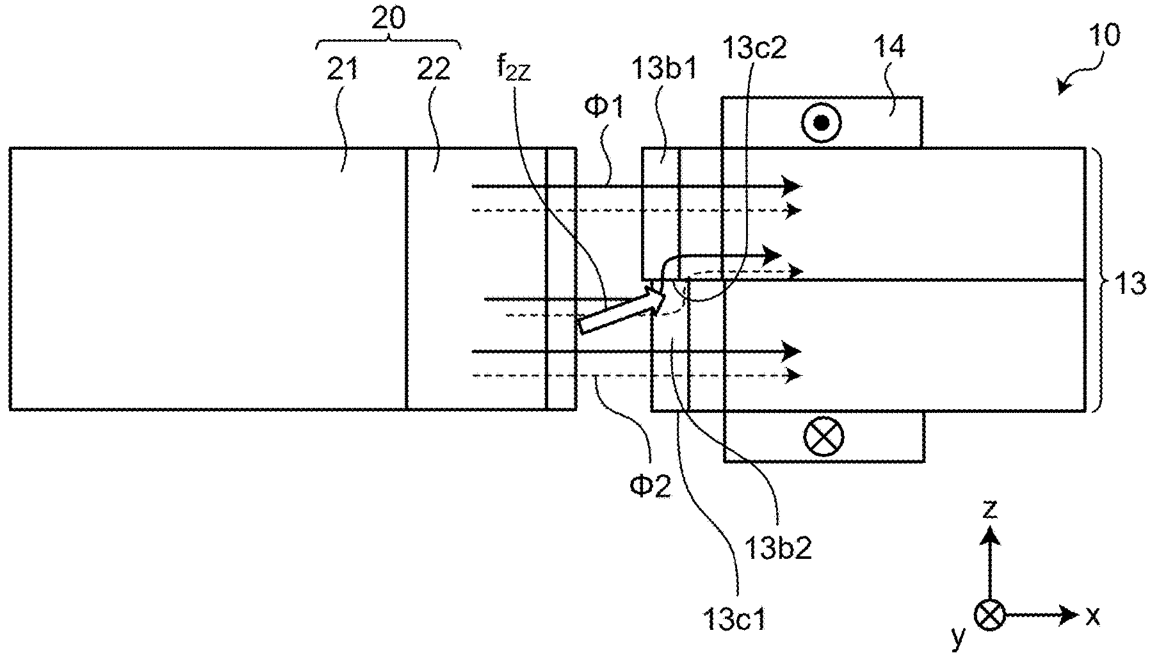
FIG. 20 is a diagram for explaining the principle of adjusting the axial restoring force of the electromagnetic rotary machinery of the sixth embodiment.
Figure 21:
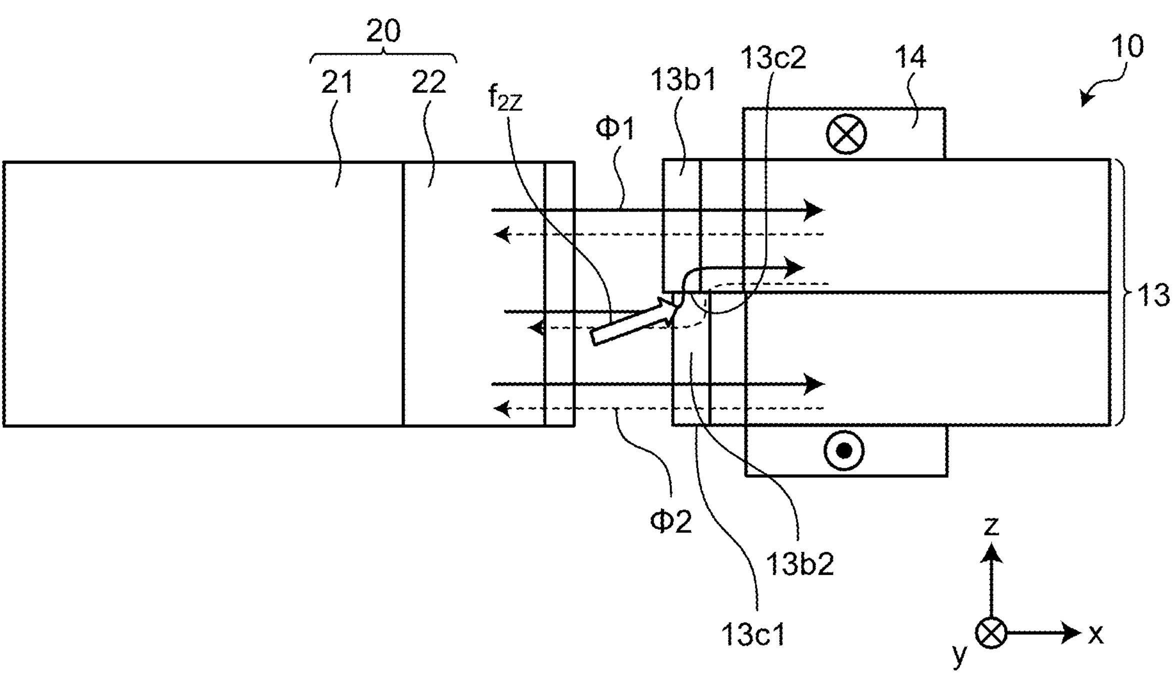
FIG. 21 is a diagram for explaining the principle of adjusting the axial restoring force of the electromagnetic rotary machinery of the sixth embodiment.

FIG. 18 is a diagram for explaining the principle of adjusting an axial restoring force of an electromagnetic rotary machinery of a sixth embodiment. FIG. 19 is a diagram for explaining the principle of adjusting the axial restoring force of the electromagnetic rotary machinery of the sixth embodiment. In FIGS. 18 and 19, the rotor 20 is displaced in a-z direction, and the direction of the current flowing through the winding 14 is different between FIGS. 18 and 19. FIG. 20 is a diagram for explaining the principle of adjusting the axial restoring force of the electromagnetic rotary machinery of the sixth embodiment. FIG. 21 is a diagram for explaining the principle of adjusting the axial restoring force of the electromagnetic rotary machinery of the sixth embodiment. In FIGS. 20 and 21, the rotor 20 is not displaced, and the direction of the current flowing through the winding 14 is different between FIGS. 20 and 21.

Normally, when there is no axial displacement of the rotor 20, no axial restoring force is generated in the rotor 20, but as described above, the permeance P in the magnetic circuit that goes around the stator 10 and the rotor 20 along the radial direction and the circumferential direction is changed in one direction of the z direction, that is, the width dimension of the tooth tip 13*b* of the teeth 13, the circumferential width of the tooth body 13*a*, the inner diameter of the tooth tip 13*b*, the material of the stator core 11, or the like is changed in one direction of the z direction in a plurality of tiers or linearly, whereby the axial restoring force is generated without axial displacement of the rotor 20. This is due to the bias magnetic flux generated between the rotor 20 and the stator 10 by the bias current or the magnets. As described above, the axial restoring force includes the axial restoring force $f_{1Z}$ generated in proportion to the axial displacement of the rotor 20 and the axial restoring force $f_{2Z}$ generated constantly regardless of the axial displacement, where both of these axial restoring forces can be increased or decreased by a d-axis current.

FIGS. 18 to 21 illustrate a case where the rotor 20 includes the permanent magnets 22. FIG. 18 illustrates a case where a positive d-axis current is flowed through the winding 14 so as to increase magnetic flux Φ1 due to the permanent magnet 22. At this time, the magnetic flux Φ1 due to the permanent magnet 22 indicated by the solid lines is further increased by magnetic flux Φ2 due to the winding 14 indicated by the dotted lines. As a result, the axial restoring force $f_{1Z}$ generated in proportion to the axial displacement and the axial restoring force $f_{2Z}$ increase. On the other hand, in FIG. 19, the magnetic flux Φ1 due to the permanent magnet 22 indicated by the solid lines and the magnetic flux Φ2 due to the winding 14 indicated by the dotted lines are in opposite directions and weaken each other. As a result, the axial restoring force $f_{1Z}$ and the axial restoring force $f_{2Z}$ decrease.

FIGS. 20 and 21 illustrate a case where the rotor 20 is not displaced in the axial direction, or z=0. At this time, the axial restoring force $f_{1Z}$ generated in proportion to the displacement in the axial direction is zero. However, the axial restoring force $f_{2Z}$ is generated and can be increased or decreased by the d-axis current. In FIG. 20, a positive d-axis current is flowed through the winding 14 so as to increase the magnetic flux Φ1, and the axial restoring force $f_{2Z}$ increases. In FIG. 21, a negative d-axis current is flowed through the winding 14 so as to decrease the magnetic flux Φ1, and the axial restoring force $f_{2Z}$ decreases.

This will be described using mathematical expressions. The d-axis current is denoted by "id". It is also assumed that the d-axis current changes the axial restoring force $f_{1Z}$ by $(1+k_{Zi1}\cdot i_d)$ times. Here, "$k_{Zi1}$" is a coefficient indicating a rate of change of the axial restoring force $f_{1Z}$ due to the d-axis current. Similarly, it is assumed that the d-axis current changes the axial restoring force $f_{2Z}$ by $(1+k_{Zi2}\cdot i_d)$ times. Here, "$k_{Zi2}$" is a coefficient indicating a rate of change of the axial restoring force $f_{2Z}$ due to the d-axis current. The equation of motion in the axial direction is as follows.

$$F_Z = -mg - kz(1 + k_{Zi1} \cdot i_d)f_{1Z} + (1 + k_{Zi2} \cdot i_d)f_{2Z}$$

In the case of no axial displacement (z=0), the equation of motion in the axial direction is as follows.

$$F_Z=-mg+(1+k_{Zi2}\cdot i_d)f_{2Z}$$

Therefore, in both cases of z<0 and z=0, with a controller for increasing/decreasing the d-axis current "$i_d$", the resultant force $F_Z$ in the axial direction acting on the rotor 20 can be adjusted. Note that even when z>0, the resultant force $F_Z$ in the axial direction acting on the rotor 20 can be similarly adjusted.

For stable magnetic levitation, it is important to reduce vibration of the rotor 20. In order to do that, it is only required to include the controller that detects the vibration in the axial direction of the rotor 20 and controls to increase/decrease the d-axis current flowing through the winding 14 according to the vibration detected.

That is, according to the sixth embodiment, even without axial displacement, the axial restoring force can be adjusted so as to reduce the vibration in the axial direction.

The configurations illustrated in the above embodiments each merely illustrates an example of the content of the present disclosure, and can thus be combined with another known technique or partially omitted and/or modified without departing from the scope of the present disclosure.

REFERENCE SIGNS LIST

1 bearingless motor; 2 gap; 3 magnetic bearing; 10 stator; 11, 11-1, 11-2 stator core; 12 back yoke; 12-1 upper back yoke; 12-2 lower back yoke; 13 teeth; 13*a* tooth body; 13*a*1 upper tooth body; 13*a*2 lower tooth body; 13*b* tooth tip; 13*b*1 upper tooth tip; 13*b*2 lower tooth tip; 13*b*3 middle tooth tip portion; 13*c*1 lower end; 13*c*2 intermediate portion; 14 winding; 15 region; 16 sensor; 17, 18 groove; 17*a* upper exposed surface; 20 rotor; 21 rotor core; 22 permanent magnet; fz, $f_{1Z}$, $f_{2Z}$ axial restoring force; kz restoring force coefficient; Δz axial displacement.

The invention claimed is:

1. An electromagnetic rotary machinery comprising:

a rotor; and a stator disposed across a gap from the rotor, wherein the electromagnetic rotary machinery is configured to generate a bearing force that causes the rotor to levitate without contact, by an electromagnetic force or a magnetic force, at least one of the rotor and the stator includes a plurality of teeth formed of a plurality of tiers of iron cores around which a winding is wound, and permeance of at least one of the gap and the iron cores in a magnetic circuit that goes around the stator and the rotor along a radial direction and a circumferential direction decreases in one direction from one end side to another end side in an axial direction by changing at least one of:

a circumferential width of a tooth tip of each of the teeth;

a circumferential width of a tooth body;

a radial width of a back yoke disposed on an outer peripheral side of the tooth body:

a circumferential width or a radial length of a groove in the tooth tip; and permeability of the teeth, where the permeance is an amount that represents ease of flowing of magnetic flux.

2. The electromagnetic rotary machinery according to claim 1, wherein a circumferential width of a tooth tip, which is a tip of each of the teeth, decreases in one direction from one end side to another end side in the axial direction.

3. The electromagnetic rotary machinery according to claim 2, wherein in each of the teeth, a first tooth including a first tooth tip and a second tooth including a second tooth tip that has a smaller circumferential width than the first tooth tip are disposed in the axial direction.

4. The electromagnetic rotary machinery according to claim 3, wherein the second tooth is disposed vertically below the first tooth.

5. The electromagnetic rotary machinery according to claim 3, wherein a sensor is disposed between the second tooth tips adjacent to each other.

6. The electromagnetic rotary machinery according to claim 1, wherein each of the teeth includes a first tooth and a second tooth that are disposed in the axial direction, and a circumferential width of a second tooth body of the second tooth is smaller than a circumferential width of a first tooth body of the first tooth, or a radial width of a second back yoke disposed on an outer peripheral side of the second tooth body is smaller than a radial width of a first back yoke disposed on an outer peripheral side of the first tooth body.

7. The electromagnetic rotary machinery according to claim 6, wherein a sensor is disposed between the second tooth bodies adjacent to each other.

8. The electromagnetic rotary machinery according to claim 1, wherein in each of the teeth, a first tooth including a first tooth tip and a second tooth including a second tooth tip are disposed in the axial direction, and the second tooth tip includes a groove in a surface facing the stator or the rotor, and the first tooth tip does not include a groove in a surface facing the stator or the rotor.

9. The electromagnetic rotary machinery according to claim 1, wherein in each of the teeth, a first tooth including a first tooth tip and a second tooth including a second tooth tip are disposed in the axial direction, the first tooth tip includes a first groove in a surface facing the stator or the rotor, the second tooth tip includes a second groove in a surface facing the stator or the rotor, and a circumferential width or a radial length of the second groove is greater than a circumferential width or a radial length of the first groove.

10. The electromagnetic rotary machinery according to claim 1, wherein each of the teeth includes a first tooth and a second tooth that are disposed in the axial direction, and a material of the iron core including the first tooth has a higher magnetic flux density than a material of the iron core including the second tooth when magnetic field strength is equal.

11. The electromagnetic rotary machinery according to claim 1, wherein an inner diameter of a tooth tip, which is a tip of each of the teeth, or a gap length as a length of the gap decreases in one direction from one end side to another end side in the axial direction.

12. The electromagnetic rotary machinery according to claim 11, wherein in each of the teeth, a first tooth including a first tooth tip and a second tooth including a second tooth tip that has a larger inner diameter than the first tooth tip are disposed in the axial direction.

13. The electromagnetic rotary machinery according to claim 1, comprising a controller to adjust a d-axis current applied to the winding and increase or decrease a force with which the rotor is attracted to the stator in the axial direction.

14. The electromagnetic rotary machinery according to claim 1, wherein the rotor is configured to levitate by the electromagnetic force or the magnetic force without contact.

* * * * *